(12) United States Patent
Dunn et al.

(10) Patent No.: US 9,865,092 B2
(45) Date of Patent: *Jan. 9, 2018

(54) METHOD AND SYSTEM FOR PREDICTIVE PROCESSING OF VIRTUAL REALITY CONTENT

(71) Applicant: Immersive Enterprises, LLC, New York, NY (US)

(72) Inventors: Charles Dunn, Astoria, NY (US); Taher Baderkhan, New York, NY (US); Vincent Machacek, Brooklyn, NY (US); Husam Aldalaq, New York, NY (US); Juan Ferreira, Richmond Hill, NY (US); Daniel Morton, Elmsford, NY (US); Moshe Ben-Zacharia, New York, NY (US)

(73) Assignee: Immersive Enterprises, LLC, New York, NY (US)

( * ) Notice: Subject to any disclaimer, the term of this patent is extended or adjusted under 35 U.S.C. 154(b) by 48 days.

This patent is subject to a terminal disclaimer.

(21) Appl. No.: 15/151,322

(22) Filed: May 10, 2016

(65) Prior Publication Data

US 2017/0316609 A1    Nov. 2, 2017

Related U.S. Application Data

(63) Continuation of application No. 15/143,424, filed on Apr. 29, 2016, now Pat. No. 9,721,393.

(51) Int. Cl.
*G06T 19/00*    (2011.01)
*H04L 29/06*    (2006.01)
(Continued)

(52) U.S. Cl.
CPC ............ *G06T 19/006* (2013.01); *G06F 3/013* (2013.01); *H04L 67/18* (2013.01); *H04L 67/38* (2013.01)

(58) Field of Classification Search
None
See application file for complete search history.

(56) References Cited

U.S. PATENT DOCUMENTS

| 6,005,611 | A  | 12/1999 | Gullichsen et al. |
| 2016/0021373 | A1 | 1/2016 | Queru |
| 2016/0353146 | A1 | 12/2016 | Weaver |

OTHER PUBLICATIONS

Bitmovin, "VR and 360o Video from Encoding to Playout," Apr. 23, 2016, http://web.archive.org/web/20160423045729/https://bitmovin.com/tutorials/vr-360-video-encoding-playout/#mobile-menu.

(Continued)

*Primary Examiner* — Nicholas R Wilson
(74) *Attorney, Agent, or Firm* — Knobbe, Martens, Olson & Bear, LLP

(57) ABSTRACT

Aspects of the present disclosure include a method and system for the predictive processing of virtual reality content that enables a more immersive experience to the user by adaptively changing parameters of virtual reality content using desired resolution distributions. in some embodiments, the desired resolution distributions can be used in generating resolution-defined projections. The resolution-defined projections can be two-dimensional and virtual reality content agnostic. According to some aspects, the projections can be used to generate virtual reality content images and video that can be encoded and/or compressed using predictive processing and transmission with lower or without increasing bandwidth requirements, and to be perceived of a higher resolution. Additional aspects include, the adaptive focus via the resolution-defined projections using the user's viewing direction and/or orientation, optimization data from a feedback loop and/or crowdsourcing data.

18 Claims, 9 Drawing Sheets

(51) Int. Cl.
*G06F 3/01* (2006.01)
*H04L 29/08* (2006.01)

(56) References Cited

OTHER PUBLICATIONS

Frank Nielsen, "High Resolution Full Spherical Videos", Sony Computer Science Laboratories, Inc., Proceedings of the International Conference on Information Technology: Coding and Computing (ITCC'02), dated 2002, in 8 pages.
Frank Nielsen, "Surround Video: A Multihead Camera Approach", Sony Computer Science Laboratories, The Visual omputer, published Feb. 3, 2005.
U.S. Pat. No. 9,721,393 including its prosecution history, the cited references, and the Office Actions herein, Aug. 1, 2017, Dunn et al.
Joseph Bertolami, "Cannes Video Codec", http://bertolami.com/index.php?engine=portfolio&content=compression&detail=cannes-video-codec, Mar. 8, 2016.
Joseph Bertolami, "Virtual Reality Video Compression" blog, http://bertolami.com/index.php?engine=blog&content=posts&detail=virtual-reality-video-codec, Oct. 11, 2015.
Aakash Patel, Gregory Rose, Conduit, "Efficient Video Compression for Live VR Streaming", https://avp.github.io/conduit/, Apr. 25, 2016.
David Pio, Facebook/Oculus Connect 2: New Techniques for Streaming VR Video, YouTube video, https://www.youtube.com/watch?v=zpuUUxMfaJs, Sep. 23-25, 2015.
Evgeny Kuzyakov, David Pio, Facebook, Next-generation video encoding techniques for 260 video and VR, https://code.facebook.com/posts/1126354007399553/next-generation-video-encoding-techniques-for-360-video-and-vr/ , Jan. 21, 2016.
Ivana Tosic, Pascal Rossard, Signal Processing Laboratory (LTS4), Low Bit-Rate Compression of Omnidirectional Images, http://infoscience.epfl.ch/record/130365/files/omni_cr.pdf, 2009.
Sebastian Perez-Duarte, David Swart, Proeedings of Bridges 2013: Mathematics, Music, Art, Architexture, Culture, "The Mercator Redemption", http://archive.bridgesmathart.org/2013/bridges2013-217.pdf.
Henry Segerman, EleVR, "Spherical video editing effects with Mobius transformations", http://elevr.com/spherical-video-editing-effects-with-mobius-transformations/, Jan. 22, 2016.
Ben Lang, Road to VR, "Hands-on: Nokia's OZO VR Cam Impresses with Capture Quality, Unique Playback Solution Has Pros and Cons", Jul. 29, 2015, http://www.roadtovr.com/hands-on-nokias-ozo-vr-cam-impresses-with-capture-quality-unique-playback-solution-has-pros-and-cons/.

METHOD AND SYSTEM FOR PREDICTIVE PROCESSING OF VIRTUAL REALITY CONTENT

RELATED APPLICATIONS

This application claims priority as a continuation application to U.S. patent application Ser. No. 15/143,424, titled "METHOD FOR PROCESSING AND DELIVERING VIRTUAL REALITY CONTENT TO A USER" filed on Apr. 29, 2016, the contents of which are incorporated herein by reference.

FIELD OF THE INVENTION

The present invention relates generally to the field of image processing in the virtual reality space and more particularly to an improved method for processing and delivering virtual reality content using spherical projections.

BACKGROUND OF THE INVENTION

The development of virtual reality technology has rapidly increased over the last few years. As virtual reality technology improves, new virtual reality applications in an array of fields including, for example, education and training, art, architectural design, movie production, advertisement, entertainment, video games, therapy, and medical fields, have been adopted or shown potential interest. The implementation of virtual reality in each field however often presents new challenges and requirements for the virtual reality application to be useful and functional. In resolving those challenges to meet each application's requirements, data content exponentially increases, compromising delivery reliability, feasibility, speeds and resolution.

Virtual reality experiences require high resolution content that is reliably delivered to the user for the experience to by fully immersive. Without a fully immersive experience, users of virtual reality are unlikely to adopt and implement the virtual reality technology for their particular application. In nearly all current virtual reality applications, the constraint on resolution generally results from the bandwidth available, as opposed to any limit on content generation. Depending on the playback device, whether it is streaming content or accessing locally stored content, and the application, additional constraints also result from the image processing and resolution due to limitations of the central processing unit (CPU), memory, screen maximum resolution, graphics processing unit (GPU) and storage capacity, power consumption, and overheating of the electronic device. These constraints in most cases decrease the level of immersion for the user and greatly compromise the reliability needed for some applications.

Recent image and video encoding and compression efforts have been explored. None of these however have resulted in a widely adopted solution due to fundamental limitations of their own. For example, various virtual reality content compression algorithms and methods specifically designed for 360-degree video have been experimented with. None have gained widespread use, nor have they adequately demonstrated their improvement over, or compatibility with, traditional video compression methods. U.S. Pat. No. 6,005,611 to Gullichsen et al., for example, describes a method that seeks to provide efficient delivery of 360-degree content where warped fish-eye lens video is stored and locally distorted depending on viewing geometry. This method by its own solution does not encode the full 360° of content, but rather only transmits and dewarps a rectangular subset of the data, irrecoverably limiting the delivered content. Because the content is irrevocably limited to only the subset transmitted, the viewer will experience dislocated views outside the transmitted region, disrupting immersion.

Alternative methods have been described in "Data compression on the sphere" http://arxiv.org/pdf/1108.3900.pdf and "Low bit-rate compression of omnidirectional images" http://infoscience.epfl.ch/record/130365/files/omni_cr.pdf, both which seek to compress data still in its spherical form. These too however have failed to be widely adopted in virtual reality applications due to the lack of flexibility between applications and projection devices. As another example of an unsuccessful compression idea for virtual reality content, U.S. Pat. Pub. No. 2016/0021373 A1 to Queru describes a method that only works with JPEG images, excluding all other forms of virtual reality content. In particular, because the method changes the number of macroblocks spatially, it must be fully integrated with the compression algorithm, rather than being an independent preprocessing step. This method also introduces compression artifacts which appear blocky and greatly hinder immersion, especially when present in stereoscopic content, as well as restricting the final resolution to be constant within all individual macroblocks. A common fundamental problem of the aforementioned compression methods is that, traditional compression algorithms have hardware support for encoding and decoding on appropriate devices, so trying to force adoption of new compression algorithms is challenging.

Due to the aforementioned require men and limitations, the prior art solutions thus suffer in their ability to enable processing and/or transmitting of high resolution virtual reality content to a user while also reducing the amount of content processed and bandwidth without compromising reliability. Accordingly:

There is a need for encoding and compression agnostic virtual reality content image processing solutions;

There is a need for image processing solutions that are flexible as to the projection functions that can be used to process and deliver virtual reality content;

There is a need for image processing solutions that result in useful distributions of resolution, such that data is uniformly and maximally useful;

There is a need for a virtual reality content processing and delivery method that can provide content flexibility and lower bandwidth requirements without compromising the virtual reality experience, for example, due to lower resolution and/or playback problems;

There is a need for a virtual reality content processing and delivery method that lowers the hardware and software requirements of processing and display devices; and There is a need for image video processing solutions that can reduce the amount of data processed by the devices to improve battery life and prevent overheating of the device.

Accordingly, improved virtual reality content processing and delivery methods and systems capable of overcoming the aforementioned needs are desired.

SUMMARY OF THE INVENTION

The foregoing needs are met, to a great extent, by the present invention, wherein in some aspects of embodiments of the invention are intended to address one or more of the above noted fundamental problems rooted in image processing for the processing limitations. The inventive aspects disclosed enable a more immersive virtual reality experience while providing flexibility in the compression method used and reducing both the amount of content processed and bandwidth requirements. In some embodiments, for example, this can be accomplished by enabling one or more of; using desired resolution distribution of projections in conjunction with adaptive focus, selectively transmitting content according to the view direction, converting spherical virtual reality content to rectangular content for encoding and/or compression, dynamically sending resolution that does not exceed the max DPI for the screen, using crowd sourced data to control the projections and/or transmission of data and lowering bandwidth requirements.

According to some aspects, a system for predictive processing and delivering virtual reality content is disclosed. The system including; one or more computer servers comprising one or more processors and one or more storage devices; and executable software stored on at least one of the one or more storage devices and executable on demand, the software operative with at least one of the one or more processors to cause the one or more computer servers to: process feedback data relating to one or more virtual reality content related events; receive sensor data to determine one or both of a user's viewing direction and an orientation; additionally receive data descriptive of the virtual reality content; one or both of predict and encourage, based on the feedback data corresponding to the location of the virtual reality content, a change in said one or both of the determined viewing direction and the determined orientation; generate one or more two-dimensional renditions from the virtual reality content captured by one or more image capturing devices; and select at least a portion of the one or more two-dimensional renditions for display by a device configured to inversely project the virtual reality content to a sphere or other three-dimensional shape, and wherein one or both of the generating of the one or more two-dimensional renditions and the selection of said least the portion of the one or more two-dimensional renditions for display is done according to said one or both of the predicted change and encouraged change in said one or more of the determined viewing direction and the determined orientation.

In some embodiments, the one or more two-dimensional renditions of the virtual reality content can be generated by mapping the virtual reality content captured by one or more image capturing devices to a two-dimensional resolution-defined projection defined by a desired resolution distribution. The feedback data relating to the one or more virtual reality content events may include one or both pre-recorded data, on the one or more storage devices, from the user's feedback during at least one previous display of virtual reality content to the user and crowd sourced data specific to the location of the virtual reality content. Alternatively, or in addition to, the feedback data relating to the one or more virtual reality content events may be pre-recorded data, on the one or more storage devices, from the user's feedback during at least one previous display of virtual reality content to the user. Similarly, the feedback data relating to the one or more virtual reality content events may be crowdsourced data recorded, on the one or more storage devices, specific to the location of the virtual reality content.

The one or more image capturing devices may be any image capturing device that is enabled to capture all or a portion of the immersive image content. For example, in some embodiments, the image capturing devices can include 360° image capturing devices. Alternatively or in addition to, in some embodiments, one or more of the capturing devices can include computers enabled to capture immersive content from a computer generated environment (i.e., in virtual space). In some embodiments, the generating of the one or more renditions can include creating a two-dimensional resolution-defined projection according to a desired resolution distribution that is modified during playback of the virtual reality content according to the retrieved parameters. Moreover, one or both of lowering the resolution and changing parameters of at least one of the one or more renditions is a function of the modified desired resolution distribution.

According to additional aspects, a corresponding method for predictive processing and delivering virtual reality content is disclosed. The method including: processing feedback data relating to one or more virtual reality content related events; receiving sensor data to determine a user's viewing direction; additionally receiving data descriptive of the location of the virtual reality content; one or both of predict and encourage, based on the feedback data corresponding to the location of the virtual reality content, a change in said one or both of the determined viewing direction and the determined orientation; generating one or more two-dimensional renditions from the virtual reality content captured by one or more image capturing devices; and selecting at least a portion of the one or more two-dimensional renditions for display by a device configured to inversely project the virtual reality content to a sphere or other three dimensional shape, and wherein one or both of the generating of the one or more two-dimensional renditions and the selection of said least the portion of the one or more two-dimensional renditions for display is done according to said one or both of the predicted change and encouraged change in said one or more of the determined viewing direction and the determined orientation.

According to yet additional aspects, another corresponding method for predictive processing and delivering virtual reality content is also disclosed. The method comprising: processing feedback data relating to one or more virtual reality content related events; additionally receiving data descriptive of the virtual reality content; identifying, based on the feedback data corresponding to the location of the virtual reality content, at least one area of interest: generating one or more two-dimensional renditions from the virtual reality content captured by one or more image capturing devices; and selecting at least a portion of the one or more two-dimensional renditions for display by a device configured to inversely project the virtual reality content to a sphere or other three-dimensional shape, and wherein one or both of the generating of the one or more two-dimensional renditions and the selection of said least the portion of the one or more two-dimensional renditions for display is done according to the identified area of interest.

Additional general optional features can additionally include, for example, predicting and/or identifying resolution distributions to control processing according to a change to take place, or be encouraged, in the viewing direction and/or orientation of the user. Other aspects of the invention will be understood by those of skill in the art upon review of the teachings herein. Other aspects of the invention may involve combinations of the above noted aspects of the invention. These other aspects of the invention may provide various combinations of the aspects presented above as well as provide other configurations, systems, functional relationships, and processes that have not been specifically set forth above.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention.

Figure 1:
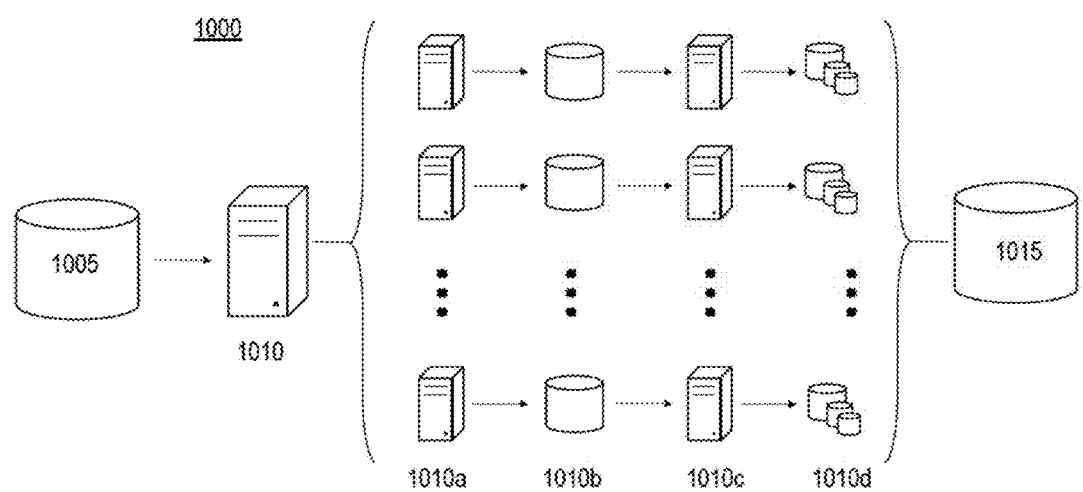
FIG. 1 is a schematic of an exemplary system that can be used according to aspects of the present disclosure.

The present invention is further described in the detailed description that follows.

DETAILED DESCRIPTION OF THE INVENTION

Going forward, various aspects of the inventions of the present disclosure may be illustrated by describing method steps or combination of method steps which overcome various limitations and problems rooted in streaming virtual reality content technology. The inventions are not limited to a particular application/field implementing virtual reality content. Various aspects of the steering device may be illustrated with reference to one or more exemplary embodiments. Moreover, as used herein, the terms "in some embodiments" or "exemplary" mean serving as an example, optional aspect, instance, or illustration, and should not necessarily, be construed as preferred or advantageous over other embodiments disclosed herein.

Glossary hi this description and claims directed to the disclosure, various terms may be used for which the following definitions will apply:

"Adaptive focus", as used herein can refer to the optimized processing and/or transmission of a selected different virtual reality image(s) that may at least partially dependent on a desired resolution distribution. In some embodiments, the desired resolution distribution may depend on a fovea field of view for the corresponding viewer's direction so that the resolution can be best for whichever direction the viewer is looking, contrast of the virtual reality image data, movement of the virtual reality image data content, capturing camera arrangement and geometry, capturing camera lenses, display parameters, and crowd sourced data relating to the virtual reality image content.

"Crowd sourced data", as used herein can refer to a collection of data collected from at least one other virtual reality user or person associated with the virtual reality content. The data collected from at least one other virtual reality user may be in relation to him/her viewing the virtual reality content and include, for example, data descriptive of head movement patterns (specific or non-specific to displayed content), connection, geographic location, time duration, frequency between action patterns, and the such. The data collected from at least one other person associated with the virtual reality content may include, for example, data collected from the at least one other person that is part of or has directly viewed the virtual reality content (either live or in the past).

"Desired resolution distribution", as used herein can refer to a spatial resolution function that can be defined by one or more of the fovea field of view for a particular viewing direction, contrast of the virtual reality image data, movement of the virtual reality image data content, camera arrangement, camera lenses, and crowd sourced data.

"Fovea field of view", as used herein can refer to a correlation of spherical virtual reality image content and the human's field of view that is of higher visual acuity/sensitivity near the center of the retina. More specifically, about 200 degrees horizontally, of the 360 degrees of content, and 135 degrees vertically, of the 180 degrees of content, with higher resolutions, for example, at about 10 degrees from direction of focus to gradually degraded towards the periphery.

"Image content" or "image data" as used herein can include 360 content in either one or both of three-dimensional and two-dimensional formats for processing and display by virtual reality devices and, in some embodiments, immersive displays of wireless devices, smartphones, tablets, PCs, desktops, smart TVs and the such. The virtual reality devices or immersive displays are capable of processing selected portions of the 360 content in still images and/or video clips. Accordingly, image content or image data can include both captured still images or portions thereof and/or video.

"Projection", as used herein can refer to the mapping of virtual reality spherical image data to flat rectangular data. According to aspects of the disclosure, the projection can be a resolution-defined projection as to enable compression and higher resolution virtual reality experiences with lower virtual reality content transmission bandwidths.

"Resolution-defined projection", as used herein can refer to a projection that is defined by a resolution distribution. In some embodiments, the projection may be able to adapt to a separable resolution distribution. The separable resolution distribution function may be, for example, a product of two different resolution functions, one for each of azimuth and elevation. Accordingly, the basis for a resolution-defined projection may be equirectangular or any bijective projection that has a separable Jacobian.

"User specific learned behavior", as used herein may refer to the customized delivery of virtual reality content to a user according at least in part to feedback data from one or more previous virtual reality content experiences (i.e. feedback loop data) of the user.

"Virtual reality content" or "virtual reality image data", as used herein refer to any one or more of "image content"/"image data" recorded, received, processed (including during encoding, storing, and compression), and transmitted, in one of a 3 dimensional spherical format or any other 3 dimensional shape, 2 dimensional rectangular format or projected (e.g., as video onto a spherical display) according to the different aspects of the process disclosed.

Furthermore, it shall be understood that a projection into a sphere or any other three dimensional shape can refer to the way the image is processed to generate an immersive image/video that can be displayed and not to the shape of the screen of the device. i.e., the spherical or 3D shape projecting aspect is a function of the software in generating the rendering and not of the display shape.

The embodiments of the invention and the various features and advantageous details thereof are explained more fully with reference to the non-limiting embodiments and examples that are described and/or illustrated in the accompanying drawings and detailed in the following description. It should be noted that the features of one embodiment may be employed with other embodiments as one skilled in the art would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced in the transmission and processing of virtual reality content and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals can represent common steps/parts throughout the drawings.

Virtual reality content can be immersive because a user can be entirely surrounded by a virtual environment. As opposed to traditional image or video displayed on a screen, virtual reality immersive experiences fill every possible viewing direction. A virtual reality experience thus requires processing of a full sphere of image content. This sphere of content often must be delivered both in high resolution and over a bandwidth-constrained network(s). Compression of the content can be essential, according to aspects of the disclosure to optimally utilize existing algorithms for image and video data compression, the virtual reality input can be mapped to be flat and rectangular. Accordingly, as further described in the exemplary embodiments herein, a projection can be used along with desired resolution distributions to convert the three-dimensional (3D) spherical content in virtual reality space to the two-dimensional (2D) rectangular representation for input to encoding methods. In this description, various exemplary projections and resolution functions are further disclosed to demonstrate the inventive aspects of the resolution-defined projections useful for virtual reality content processing and delivery.

To one skilled in the art, this disclosure enables at least: (a) encoding and compression agnostic image content processing solutions; (b) process flexibility as to the projection functions that can be used to process and deliver image content; (c) solutions that can work using arbitrary resolution functions; (d) a virtual reality content processing and delivery method that can provide compression and content flexibility and lower bandwidth requirements without compromising the virtual resolution experience, for example, due to lower resolution and/or playback problems; (e) a solution to can lower the amount of image data processed to reduce power consumption and overheating of the device; (f) method that enables useful distributions of resolution, such that data is uniformly and maximally useful; (g) a method that can enable the changing of the resolution sent based on display and/or processing parameters; and (h) a virtual reality content processing and delivery method that lowers the hardware and software requirements of display devices.

Referring now to FIG. 1, a schematic of an exemplary system 1000 that can be used according to aspects of the present disclosure is depicted. In particular, the system 1000 which can better process and transmit image content for providing an immersive experience to users. According to some aspects, image content 1005 can be transmitted to a computer server 1010. Transmission may take place via-wireless or wired connections automatically or upon request. For example, image content 1005 may be downloaded or streamed from one or an array of 360 image content capturing device(s). In some embodiments, the system may be a distributed system with a main computer server 1010 handling the loading of the image content inputted and scheduling and/or transferring content to various processors 1010a that can work in parallel, for example, to independently re-sample the image content and map it to new projection spaces according to the methods described herein. Processed image content 1010b can then include variously projected versions in the variety of new projection spaces. Processors 1010a and/or additional distributed processors 1010c which may also work in parallel can downsample and/or encode the image content to a variety of video sizes, bitrates, and settings. The variously projected and variously encoded versions 1010d, including image content in a variety of projection spaces and encoded at a variety of settings, may be further processed and/or arranged to be stored in database 1015 as renditions aggregated and made ready for playback on demand.

Figure 2:
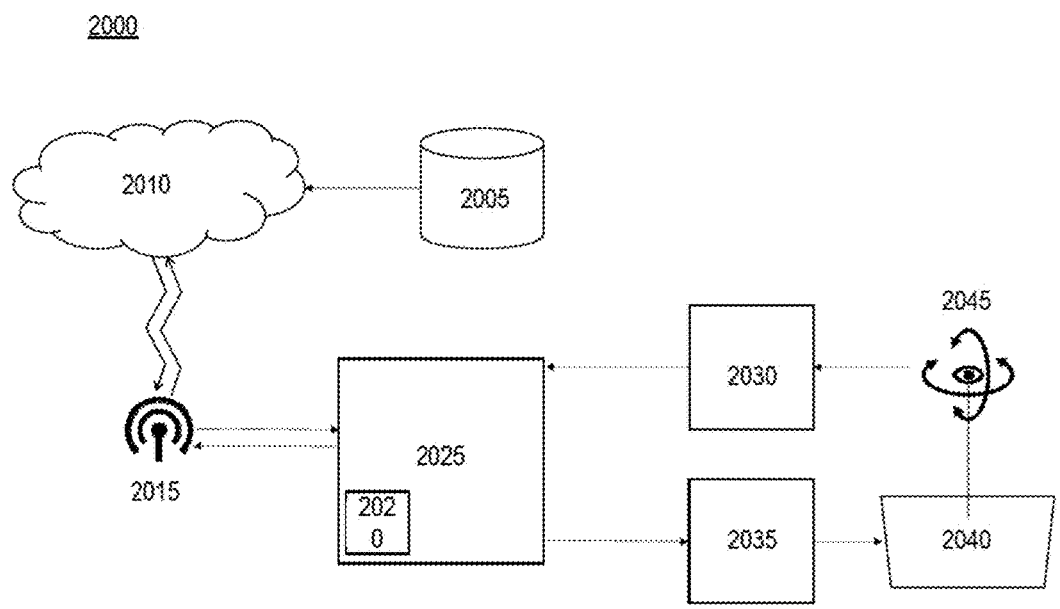
FIG. 2 is a schematic of an exemplary arrangement of functional components that can be used according to aspects of the present disclosure.

Referring now to FIG. 2, a schematic diagram 2000 including an exemplary arrangement of functional components that can be used according to aspects of the present disclosure is depicted. In particular, the schematic diagram 2000 showing interaction between the system components for carrying out the improved methods of processing and transmission of image content. According to some embodiments, variously projected and variously encoded versions of the image content 2005 can be saved in a database managed by the provider. The image content 2005 can be transmitted via a network, for example, a wireless network 2010, to an antenna 2015 capable of transmitting requests for content, along with related information for the request of specific renditions, and receiving the image content. The antenna 2015 can be in communication with a central processing unit 2025 that can receive the image content 2005 and include or be in connection with a video decoder 2020 enabled to process the image content and get pixel values. in alternative embodiments, the content may be downloaded, for example, via a direct connection, or the system may be fully integrated.

According to aspects of the disclosure, the central processing unit can receive and process one or more input(s) 2030 including, for example, from an accelerometer, gyroscope, crowdsource data, viewing parameters, or other sensor. Input(s) 2030 may come from sensors associated with the display device 2040 for the user 2045 or from stored parameters and preferences or data relating to prior experiences from other users (i.e. crowdsourced data). The display device 2040 can receive the data from a graphics processing unit 2035 in, direct or indirect, communication with the video encoder 2020.

Figure 3:
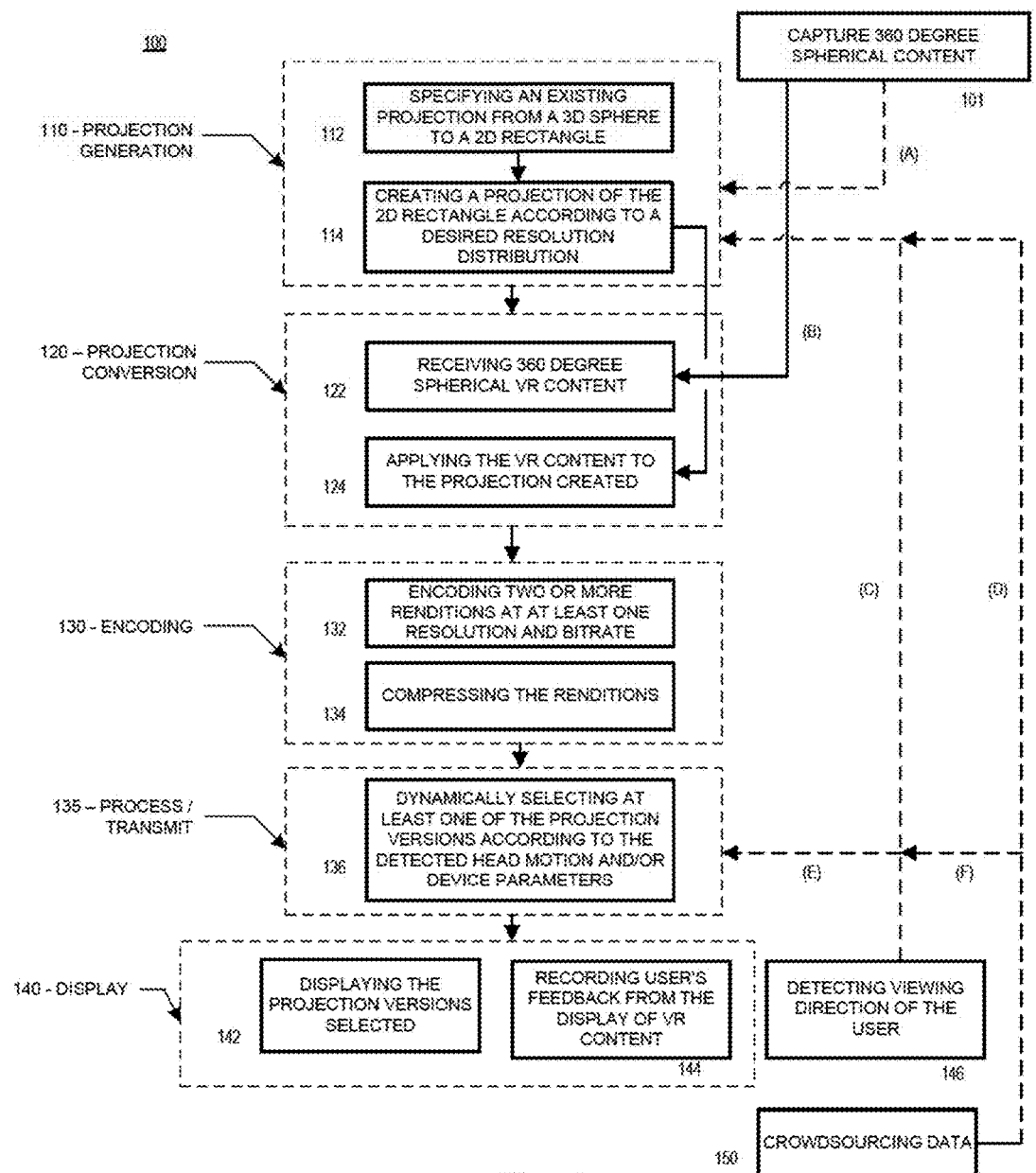
FIG. 3 is a flowchart illustrating method steps that may be implemented for the processing and delivery of virtual reality content according to some aspects of the disclosure.

Referring now to FIG. 3, a flowchart 100 illustrating method steps that may be implemented for the processing and delivery of virtual reality content according to some aspects of the disclosure is shown. More particularly, the method steps which enable the use of existing two-dimensional image compression methods for virtual reality content, at least in part, by optimizing the conversion from spherical virtual reality content to rectangular content so that can be easily compressed through any two-dimensional encoding methods, including but not limited to the JPEG or H.264. This optimization may be done in conjunction with adaptive focus aspects as taught by this disclosure. Adaptive focus as used herein can refer to the optimized processing and/or transmission of a selected different virtual reality image(s) that may at least partially dependent on a viewer's direction. In some embodiments, the selection of may additionally depend on a resolution distribution based on the fovea field of view for the corresponding viewer's direction, so that the resolution can be best for whichever direction the viewer is looking.

By controlling the resolution distribution to match the view direction, virtual reality content can be transmitted in a manner that is compressed to give the most immersive experience for a set of view directions. This approach is contrary to current virtual reality content processes that require virtual reality encoding be performed for all of the same data, regardless of view direction, thus increasing processing and transmission bandwidth requirements. By overcoming this requirement, the method steps disclosed can greatly reduce the required bandwidth for virtual reality content, even while potentially boosting the observed resolution. Moreover, the amount of image content that needs to be processed for display is significantly reduced. By reducing this processing power consumption can also be reduced, improving reliability of the delivery and preventing overheating of the device.

Referring back to FIG. 3, the virtual reality content delivery process disclosed in flowchart 100 can generally consist of four main parts—projection generation 110, projection conversion 120, encoding 130, processing, including accessing, or transmission 135 and display 140. Beginning with projection generation at 110, a mapping from a sphere to a flat rectangle can be generated. This projection can be used to map the spherical virtual reality content to a rectangular format, in part to enable encoding with traditional algorithms such as JPEG or H.264. Depending on the virtual reality content and/or the encoding desired, at step 112, at least one existing projection may be specified/selected to convert the 360° three-dimensional spherical content to two dimensional rectangular content. The specified/selected projection must have a separable Jacobian.

At step 114, the two-dimensional projection(s) specified/selected can be used to create a projection that is defined by a desired resolution distribution. The desired resolution distribution should describe a desired resolution function than is separable when expressed in the projection space specified/selected. With this a set of single-variable first-order differential equations can be used to solve for the final projection equation. If a solution exists, then the full projection from sphere to new projection space can be described using the solutions to the differential equations (further explained in subsequent sections of this description).

In some embodiments, the desired resolution distribution can refer to a smooth two dimensional rectangular resolution distribution that generally adjusts according one or more of the fovea field of view for a particular viewing direction, contrast of the virtual reality image data, movement of the virtual reality image data content, and crowd sourced data. Accordingly, in some embodiments, data from the captured 350° spherical content 101, the viewing direction of the user 146, crowdsourcing 150, user's feedback 144, may be transmitted (shown as (A), (C) and/or (D)) to the system for use during the projection generation 110. In accordance with aspects of the disclosure, the resolution adjustments that define the projection can result at least in part from the mathematical derivation process in the generation of the new projection (the resolution-defined projection). A few examples, including generation of the novel Gaussian and Cauchy projections is disclosed with reference to FIGS. 2 and 3.

With approach, content mapped using this resolution-defined projection can match the desired resolution function used to the create the projection (i.e., by first selecting the total number of pixels desired in the output, it is possible to then calculate the pixel dimensions for any projection.) This additionally enabled rounding up to the nearest multiple of a block size, typically 8 or 16 pixels a side, depending on the encoding settings and library. Accordingly, as previously mentioned, this method could be used to generate a resolution that matches the user's FOV, encoding settings, and/or to highlight any region of the virtual reality content, for example, to guide the attention of the user, or apply warping effects to spherical content.

Projection conversion 120 can take place once a resolution-defined projection has been created. During the projection conversion 120 phase, the 360° spherical virtual reality content may be received at step 122. At step 124, the 360° spherical virtual reality content can be applied to the resolution-defined projection. In some embodiments, the virtual reality content may then be stored in equirectangular format, although the disclosed process would support any known format regardless of the original content's projection. Taking the equirectangular format, for example, a grid of pixel points matching the dimensions of the output video may be used to map each pixel to its coordinates in the equirectangular format. Lanczos interpolation may be used to minimize projection conversion artifacts. Accordingly, in some embodiments the coordinate mapping can be defined by the projection equations and interpolation may be defined by the Lanczos interpolation method. Alternatively, any other image interpolation method could be used, including nearest neighbor, bilinear, or bicubic. However, depending on the selected method, it may be important to make sure to wrap the azimuth dimension of the equirectangular image for interpolation so there are no interpolation artifacts at the vertical edges in the new projection space. Similar techniques that incorporate the inherent spherical geometry of the content may be applied depending on the original projection of the content.

This coordinate transformation and image interpolation can be processor intensive. To account for this, in some embodiments, the process may be parallelized, for example, by each color dimension (RGB, YCbCr, or any other color space representation) so that each color may be interpolated independently. Alternatively, or in addition to, each frame of a video may also be independently interpolated. In doing so, it can be important to ensure the processing time to calculate coordinate mappings and interpolation filter values runs only once for each video with specific settings. This may be done by performing the calculation and programming the specific settings before the first frame is processed, such that all frames simply lookup the coordinate mapping and filter values. In yet additional embodiments, GPU acceleration of this process may also be implemented.

According to aspects of the disclosure, the interpolation and method steps can enable virtual reality content generation taking form as a plurality of renditions that can have much higher resolutions on a subset of the original sphere, while still serving data to cover the entire or a greater portion of the sphere. This is different than the less sophisticated method currently known which simply crops the spherical content to only display a subset of the sphere, leaving the majority of the sphere content-less. For example, it can be advantageous to serve content to cover the entire or a greater portion of the sphere because the user could turn her/his head quicker than the latency of displaying a new video. By varying the resolution distribution to enable larger content delivery without increasing the bandwidth required, if this happens, because the disclosed method still serves content everywhere/almost everywhere on the sphere (although low resolution), the user can maintain some level of immersion.

Encoding 130 of the plurality of renditions can then take place. Encoding 130 can include encoding two or more renditions at least one resolution and bitrate 132. The renditions of virtual reality content may be encoded, for example, using a H.264 at a bitrate that matches the pixel dimensions. This too may be performed in a distributed computing setup to process a single virtual reality content video input. For example, for each rendition in terms of bitrate, dimensions, and view direction, a different processor may speed up the task of encoding many video renditions. Since the costliest operation can often be the interpolation needed for projection conversion, in parallel a downscaled version of the original input virtual reality content may be generated and made available so a version is quickly available for the uploader. The rest of the virtual reality content may go through conversion to a variety of projections, projection parameters, dimensions, bitrates, and view directions. For any versions of the virtual reality content that is the same projection, projection parameters, and view direction, the larger of the versions by the standard process may be generated. It is the possible to downsize and reduce the bitrate to generate any smaller versions of the same video. This can greatly reduce computation time for these smaller version as compared with generating them directly from the original equirectangular content. In embodiments in which the processes are distributed, notification flags can be sent to a database when their individual task is complete so that a centralized record, of the status of the conversions is available.

The virtual reality content renditions can be grouped in sets according to one or more predetermined common properties between them. For example, the renditions can be grouped in sets of versions in which only view direction changes so that a set can include all of the versions of the same virtual reality content that can be served to a user depending on their view direction. Compression of the renditions 134 may take place as part of the encoding in 132 or separately as it may be desired.

Each of the virtual reality content sets may be split using a video display frequency (e.g. virtual reality image content included in a short duration virtual reality video). In some embodiments, the sets of virtual reality content may be organized in a standard structure folder structure database(s) that can allow the displaying device to easily request a different set depending on the view direction of the user detected at step 146. Head motion recorded by the virtual reality content display device and/or determined using data from the viewing direction detected, head motion can be used to dynamically select at least one of the projection versions, individually or as a data set, according to the head motion at step 136. This dynamic selection may be done, for example, similarly to the adaptive streaming methods in which the bitrate of the video displayed adaptively matches available bandwidth. However, instead of only including video quality, viewing direction can additionally be included for the dynamic selection.

In the display 140 phase, the dynamically selected virtual reality content is delivered 142 to a virtual reality device of the user. Virtual reality devices can include all head-mounted devices (HMD) for virtual reality that include head tracking, and even mobile devices which can use internal accelerometers to achieve head tracking or immersive displays of PCs, tablets, smart TVs and the such. Virtual reality devices can include but are not limited to the Samsung GearVR™ system or any Google Cardboard™ setup. The delivery can take into account specifications of the viewing device, the data connection, and the view direction, to provide content that achieves the best visible resolution for the user. In some embodiments with integrated components, the delivery can simply refer to the processing and selection of the specific image content for display within the device. In addition, in accordance with the disclosure, resolution optimization can also be a result of the dynamic selection of pre-encoded array of videos at various sizes, at various bitrates, at various rotations, and using different resolution-defined projections that take into account the small field of view of humans (i.e., fovea field of view). The fovea field of view being relatively minor in comparison to the full sphere of virtual reality content to allow higher resolution where according to the eye's resolution and is also in line by the constraints of virtual reality display devices. E.g., The Oculus Rift™ has a 110° field of view while the Samsung GearVR™ has a 96° field of view. Google Cardboard™ setups have a range of field of views, but all being less than 96°. The field of view constraints mean that a user will, at any single instant, only experience resolution in a small subset of the full sphere of content. Their eye resolution means any user's limited ability to only appreciate extremely high resolution in his/her direction of focus.

Depending on the virtual reality content and application, an infinite number of video versions could be generated to match every possible viewing direction of the user where limited virtual reality content is at issue. Having the different versions, at almost any instant, the video version could allow for it to be updated to exactly match the user's field of view. I.e., taking the user's fovea field of view resolution sensitivity and the device-limited field of view to generate a desired resolution profile for the virtual reality content transmitted to the virtual reality device to achieve minimum bandwidth requirements while still giving the viewer a perfect viewing experience. In some embodiments, in addition or alternatively to the viewing direction and fovea field of view, feedback data during the display of content, including, for example, resulting data from eye movement tracking, may be recorded at 144 for future processing and/or set up of user preferences. Eye movement may be tracked to signal attention diversion, discomfort, moving patterns and the such which additionally may be used for vision condition diagnostics or therapy treatments. For example, the feedback may be used for the early detection of color blindness or abnormal sensitivity to flashing light patterns, seasonal affective disorder therapy and similar related diagnostic/therapeutic applications. Similarly, pre-recorded and/or transmitted crowdsourced data 150 may be used to define projections, conditions, and/or parameters relating to the delivery of the specific virtual reality content for the implementation.

In larger virtual reality content applications, the resolution function can be a smoothed version of the user's exact viewing resolution distribution in order to account for deviations, including, for example, the fact that a user could move his eyes before the new rendition may be delivered. It can also allow for a narrower number of view-direction renditions as every additional view-direction rendition requires processing time to encode and storage space, so may be incentives to reduce the total number depending on the amount of content and application.

The aforementioned aspects may function via data input/output by the server and virtual reality device of the user. On the server side, processing various combinations of video parameters, and joining videos that may only differ in view direction in to an adaptive streaming playlist, split into small-duration chunks, can be achieved for display 140. On the device side, the viewing direction can be determined for a specific rendition request. Further, an estimate the bandwidth of the connection between the two can be determined using the limits imposed by processing power on the size of the video that the device can decode and a request for content that may be mapped to a specific rendition of the video. Accordingly, all or at least some of these different possible videos can be requested adaptively, with the new video arriving within one to two chunks from request.

A new video chunk may be indicated by the inclusion of a keyframe at the beginning of every chunk. The virtual reality device can be programmed, or run an application that is capable of determining which frame starts a chunk from a new video parameter set because of a flag included with this keyframe. Upon seeing a keyframe flag, the video can be reverse-projected using the latest parameters used to request this newest chunk.

At the virtual reality device, once the requested video chunk arrives and is decoded, it can be ready to be displayed as a reverse-projection. The same method as projection can be used by creating a distribution of points in the final mapping space, usual a three-dimensional sphere, mapping each pixel to its corresponding coordinates in projection space, and interpolating the pixels values near the target coordinates. The video may then be in a standard format as a texture to be applied to a three-dimensional shape in virtual reality space with higher resolutions in the areas we would like.

In some embodiments, at least some aspects could be used on 360° panoramas or any 360° virtual reality content device that would benefit from having a projection generation process for customizable resolution profiles that allows us to create virtual reality content renditions that are optimized for a range of bandwidths, devices, and/or view directions. More specifically, a projection generation process that can work both on the fly, for example, to adjust to bandwidth and device parameters, independent of viewing direction and/or according to the desired resolution based on the viewing direction.

Figure 4:
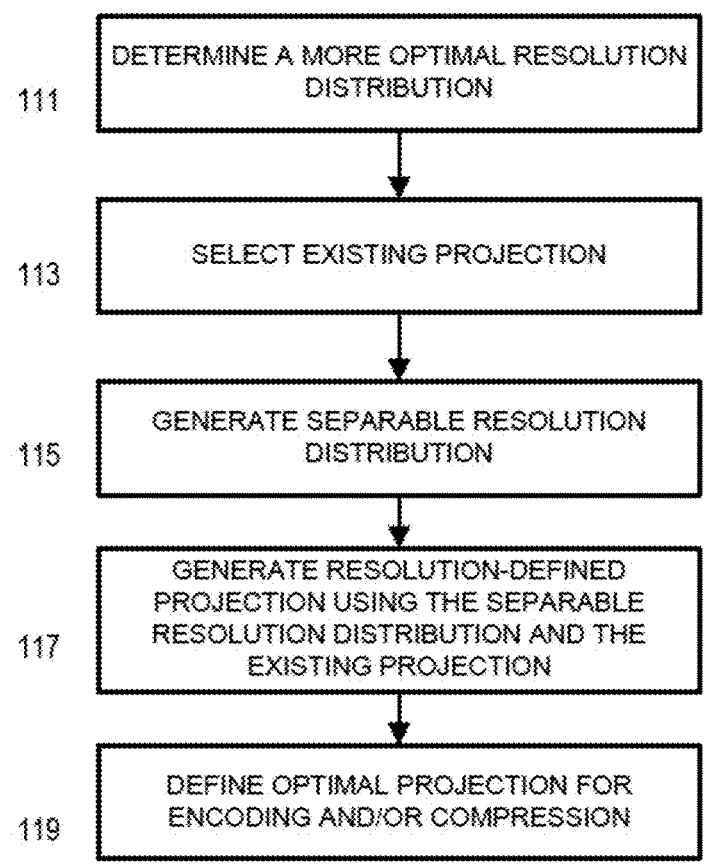
FIG. 4 is a flowchart illustrating method steps that may be implemented to generate a resolution-defined projection according to some aspects of the disclosure.
Figure 5:
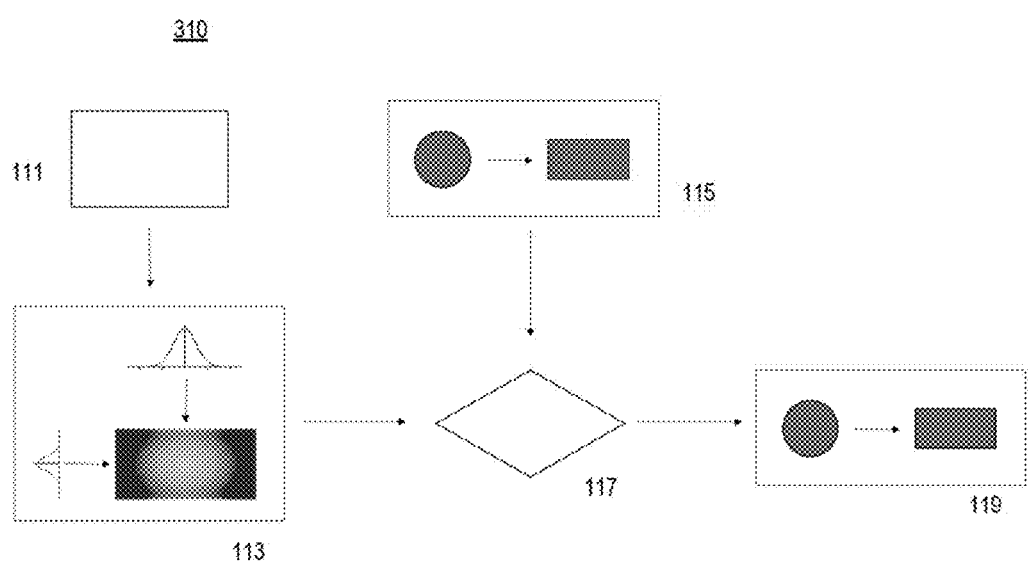
FIG. 5 is a schematic representation illustrating the method steps of FIG. 4.

Referring now to FIGS. 4 and 5, a flowchart 210 and corresponding schematic representation 310 illustrating the method steps that may be implemented to generate a resolution-defined projection according to some aspects of the disclosure are depicted. Both FIGS. 4 and 5 will reference common numeral identifiers as appropriate to help illustrate the relationship between method steps in the generating a resolution-defined projection process. Whilst specific mathematical equations and additional steps are disclosed to better enable and explain the different novel aspects of the disclosure, the scope of those aspects is to be defined by the claim limitations as interpreted in view of the more simplified steps in flowchart 210 or their corresponding equivalents.

Beginning at step 111, one or more of the fovea field of view for a particular viewing direction, contrast of the virtual reality image data, movement of the virtual reality image data content, camera arrangement, camera lenses, and crowd sourced data will inform the specification of a desired resolution distribution. At 115, an existing bijective projection from a sphere to a rectangle having a separable Jacobian, such as the equirectangular projection, may be selected to function as an intermediary projection. At 113, a desired resolution distribution informed by one or more items in 111 that is separable in the existing projection space of 115 is specified. Using the existing projection as an intermediary projection and the separable resolution distribution, at 117, a resolution-defined projection may be generated for the content to be mapped. Moreover, at 119, the resolution-defined projection and any associated parameters generated can also be used for encoding and/or compression.

The following sections elaborate on the mathematical aspects associated with the aforementioned steps used to generate resolution-defined projections.

1. Projections

The exemplary projections considered map 3D Cartesian coordinates, (x, y, z), to a new coordinate space, (u, v, w). $P \in \mathcal{R}^3 \to \mathcal{R}^3$ is set to be any such projection and $P(\cdot) \in \mathcal{R}^3 \to \mathcal{R}^1 |$ is the associated projections for the individual coordinates u, v and w.

$$P(x,y,z)=|(u,v,w)=(p_u(x,y,z),p_v(x,y,z),p_w(x,y,z)) \quad (1)$$

As shown below, for most virtual reality content applications, the projection can be invertible, with a defined $p^{-1} \in \mathcal{R}^3 \to \mathcal{R}^3$ and associated $p(\cdot)^{-1} \in \mathcal{R}^3 \to \mathcal{R}^1$.

$$(x,y,z)=P^{-1}(u,v,w)=(p_x^{-1}(u,v,w),p_y^{-1}(u,v,w),p_z^{-1}(u,v,w)) \quad (2)$$

The projections considered map the unit sphere (u.s.) in Cartesian space to a rectangle spanning only u and v in projection space, with w=w0. This region may be referred to in projection space as the unit-sphere rectangle (u.s.r.).

$$P(x,y,z)|_{(x,y,z) \in u.s.}=(u,v,w_0)=(u,v)|_{w_0} \quad (3)$$

Given that the value of w0 may be calculated for each projection, the implied |w0 notation may be omitted hereon.

$$P^{-1}(u,v) \equiv P^{-1}(u,v)|_{w_0} = P^{-1}(u,v,w_0) \quad (4)$$

2.1 Surface Integration $u \in [u_a, u_b)$, $v \in [v_a, v_b)$ and $w=w_0$ can define the unit-sphere rectangle in projection space. $|A_P|$ may be the area of the unit-sphere rectangle in projection space and $\Sigma_P$ can be a surface area element in projection space.

$$\iint_{u.s.r.} d\Sigma_P = \int_{v_a}^{v_b} \int_{u_a}^{u_b} du\, dv = (v_b - v_a)(u_b - u_a) = A_P \quad (5)$$

To differentiate the coordinate bases, the subscript $_C$ can refers to a value in Cartesian coordinates while the subscript $_P$ refers to a value in projection coordinates. The area of the unit sphere in Cartesian space can be known. $A_C$ can be the area of the unit sphere in Cartesian space and let $\Sigma_C$ be a surface area element in Cartesian space.

$$\iint_{u.s.} d\Sigma_C = 4\pi = A_C \quad (6)$$

To calculate surface integrals across coordinate spaces, the Jacobian of a projection is accounted for. The Jacobian can be a function of the inverse individual coordinate projection equations (i.e. $p_{(\cdot)}^{-1}$).

$$J(u, v) = \begin{bmatrix} \frac{\partial p_x^{-1}}{\partial u} & \frac{\partial p_x^{-1}}{\partial v} & \frac{\partial p_x^{-1}}{\partial w} \\ \frac{\partial p_y^{-1}}{\partial u} & \frac{\partial p_y^{-1}}{\partial v} & \frac{\partial p_y^{-1}}{\partial w} \\ \frac{\partial p_z^{-1}}{\partial u} & \frac{\partial p_z^{-1}}{\partial v} & \frac{\partial p_z^{-1}}{\partial w} \end{bmatrix}_{(u,v,w_0)} \quad (7)$$

Constraints can be defined on the projections P that may be considered valid, and the associated functions $P^{-1}$, $p(\cdot)$, $p^{-1}$, and J, all of which may be derived from any valid P. The surface integral of a function in Cartesian space can be evaluated in projection space by treating $f_C(x, y, z)$ as any function in Cartesian space.

$$\iiint f_C(x,y,z) d\Sigma_C = \iiint f_C(P^{-1}(u,v)) \|J(u,v)\| d\Sigma_P \quad (8)$$

By integrating over the unit sphere in Cartesian space, more explicit parameters can be defined for the integration since the integration may be done over the unit-sphere rectangle in projection space.

$$\int\int_{u.s.} f_C(x, y, z) d\Sigma_C = \int\int_{u.s.r.} f_C(P^{-1}(u, v)) \|J(u, v)\| d\Sigma_P \quad (9)$$
$$= \int_{v_a}^{v_b} \int_{u_a}^{u_b} f_C(P^{-1}(u, v)) \|J(u, v)\| du\, dv$$

Accordingly, the Jacobian of a projection can define the warping of space due to a projection. This in essence may be the same or significantly similar to the warping of space which can affect the resolution of the spherical output content.

2. Resolution Functions

Spatial resolution r can be defined as the local density of independent pixels, or the local ratio of independent pixels $\sigma N$ to the area they occupy $\sigma\Sigma$. This can be the information used as the density of an image. Spatial resolution is not necessarily constant over an image.

$$r(u, v) \equiv \frac{\partial N}{\partial \Sigma}(u, v) \quad (10)$$

Pixel density $\rho$ can be defined as the ratio of discrete pixels M to the area they occupy $|A|$. These discrete pixels are not necessarily independent, as it is in the case of a blurred or upsampled image. Pixel density can be treated as being constant over an image. Even when considering the theoretical pixels over a 3D sphere of content, the pixels can all be significantly identical/identical, as it may be from a spherical tessellation of triangular pixels to form an icosahedron.

$$\rho \equiv \frac{M}{|A|} \quad (11)$$

Pixel density $\rho$ and spatial resolution r may not necessary be equivalent as they may only be the same when each pixel is independent from all other pixels. Spatial resolution cannot exceed pixel density, but pixel density could be higher than spatial resolution, as it may be the case with a blurred or upsampled image.

$$r \leq \rho \quad (12)$$

$_i r_C$, $_i \Sigma_C$, $_i N_C$, and $|_i A_C|$ can be the spatial resolution, pixel density, independent pixel count, and total area of the spherical input content, respectively. It may be assumed that the content could have been generated (via cameras or computers) in a way such that the spatial resolution can be constant and equal to the pixel density. The spherical input data may cover a unit sphere, so the total area of the content $_i A_C$ can be taken as $4\pi$.

$$_i r_C = {}_i\rho_C = \frac{_i N_C}{|_i A_C|} = \frac{_i N_C}{4\pi} \quad (13)$$

The resolution of the mapped data $r_P$ can be the same as the pixel density $\rho P$ if we limit the pixel count $N_P$ such that no oversampling of the spherical input content occurs. This may be a reasonable assumption since the pixel count of the mapped content can typically be much lower than the largest available version of the spherical input content.

$$r_P = \rho_P = \frac{N_P}{|A_P|} \quad (14)$$

The spatial resolution of the spherical output content $r_C$ may be constrained by the mapped content resolution. The pixel density of the spherical output data $\rho_C$ can be determined by the field of view and screen size of the display device. Considering current virtual reality headset resolutions and mobile network bandwidths, the pixel density can typically be much higher than the spatial resolution, which is often bandwidth constrained. This can be the first case where the pixel density can be higher than the spatial resolution, due to oversampling when inverse projecting the mapped content to spherical output content.

$$r_C(x, y, z) = \frac{\partial N_C}{\partial \Sigma_C}(x, y, z) \leq \rho_C = \frac{M}{|A_C|} = \frac{M}{4\pi} \quad (15)$$

The spatial resolution may not be uniform due to the warping of the uniform pixels of the mapped content during reverse projection. This warping can be exactly captured by the magnitude of the determinant of the Jacobian. We include a normalizing term $\alpha$ so the integral of spatial resolution can be the total information content, which may be equal to the total number of mapped content pixels $N_P$.

$$r_C(x, y, z) = \frac{\partial N_C}{\partial \Sigma_C}(x, y, z) = \frac{N_P}{\alpha} \frac{1}{\|J(P(x, y, z))\|} \quad (16)$$

Using Equations 5 and 9, we can solve for $\alpha$.

$$\alpha = \left| \int\int_{u.s.} \frac{1}{\|J(P(x, y, z))\|} d\Sigma_C \right| \quad (17)$$

$$= \left| \int\int_{u.s.r.} \frac{1}{\|J(P(P^{-1}(u, v)))\|} \|J(u, v)\| d\Sigma_P \right|$$

$$= \left| \int_{v_a}^{v_b} \int_{u_a}^{u_b} \frac{\|J(u, v)\|}{\|J(u, v)\|} du\, dv \right|$$

$$= |A_P|$$

We see that the normalizing factor α for any projection can be equal to the area of the unit-sphere rectangle in projection space. This thus provides an equation that explicitly relates a projection to the resulting spatial resolution of the final virtual reality content.

$$r_C(x, y, z) = \frac{N_P}{|A_P|} \frac{1}{\|J(P(x, y, z))\|} \quad (18)$$

3.1 Equirectangular Resolution Function

The Equirectangular projection can be a projection from the unit sphere to a rectangle in latitude-longitude space. This may be the spherical coordinate representation of a sphere, with longitude $u \in [-\pi, \pi)$, latitude $$v \in \left[-\frac{\pi}{2}, \frac{\pi}{2}\right],$$

and radius w ($w_0=1$).

The Equirectangular projection can be the current standard for virtual reality content delivery and storage.

$$p_x^{-1}(u, v, w) = w\cos(v)\cos(u) \quad (19)$$

$$p_y^{-1}(u, v, w) = w\cos(v)\sin(u) \quad (20)$$

$$p_z^{-1}(u, v, w) = w\sin(v) \quad (21)$$

$$p_u(x, y, z) = \tan^{-1}\left(\frac{y}{x}\right) \quad (22)$$

$$p_v(x, y, z) = \sin^{-1}\left(\frac{z}{\sqrt{x^2 + y^2 + z^2}}\right) \quad (23)$$

$$p_w(x, y, z) = \sqrt{x^2 + y^2 + z^2} \quad (24)$$

$$J(u, v, w) = \begin{vmatrix} \frac{\partial p_x^{-1}}{\partial u} & \frac{\partial p_x^{-1}}{\partial v} & \frac{\partial p_x^{-1}}{\partial w} \\ \frac{\partial p_y^{-1}}{\partial u} & \frac{\partial p_y^{-1}}{\partial v} & \frac{\partial p_y^{-1}}{\partial w} \\ \frac{\partial p_z^{-1}}{\partial u} & \frac{\partial p_z^{-1}}{\partial v} & \frac{\partial p_z^{-1}}{\partial w} \end{vmatrix}_{(u,v,w)} \quad (25)$$

$$= \begin{vmatrix} -w\cos(v)\sin(u) & -w\sin(v)\cos(u) & \cos(v)\sin(u) \\ w\cos(v)\cos(u) & -w\sin(v)\sin(u) & \cos(v)\sin(u) \\ 0 & w\cos(v) & \sin(v) \end{vmatrix}$$

$$c\|J(u, v, w)\| = |w^2 \cos(v)| \quad (26)$$

Because there is transformation of points from the unit sphere that can be taking place, $\sqrt{x^2+y^2+z^2}=1$ and $w_0=1$.

$$\|J(u,v)\| = \cos(v) \quad (27)$$

$$|A_P| = |(v_b - v_a)(u_b - u_a)| = 2\pi^2 \quad (28)$$

Equation 18 may be used to solve for the resolution function resulting from the Equirectangular projection.

$$r_C(x, y, z) = \frac{N_P}{|A_P|} \frac{1}{\|J(P(x, y, z))\|} = \frac{N_P}{2\pi^2 \cos(\sin^{-1}(z))} = \frac{N_P}{2\pi^2 \sqrt{1-z^2}} \quad (29)$$

The spatial resolution of virtual reality content delivered via the Equirectangular projection can actually be at a minimum along the equator ($z2=0$), and approaches at the poles ($z2=1$). Since most virtual reality content often includes important content along the equator, this may be nearly the opposite of what is desired. This thus can demonstrate how the projection chosen can be used to determine the shape of the spatial resolution of the final content—through the projection's Jacobian. Following is an exemplary demonstration on how to solve for a Jacobian given a target resolution function. By implementing this, a specified appropriate resolution function can be used to derive an application-specific projection according to the various aspects of the disclosure.

4. Resolution-Defined Projections

Given exemplary target resolution function rC (x, y, z), solving for the corresponding resolution-defined projection P is desired. If a solution exists, using this projection can lead to a spherical output content resolution that may be identical to our target resolution function.

$$r_C(x, y, z) = \frac{N_P}{|A_P|} \frac{1}{\|J(P(x, y, z))\|} \quad (30)$$

Again, Np can be the number of pixels in the unit-sphere rectangle in the resolution-defined projection space and $|A_p|$ can be the area of the unit-sphere rectangle in the resolution-defined projection space. J is the Jacobian for the resolution-defined projection P. By rearranging the terms to have an explicit equation for J the target resolution function $r_C$ can be defined.

$$\|J(u, v)\| = \frac{N_P}{|A_P|} \frac{1}{r_C(P^{-1}(u, v))} \quad (31)$$

4.1 Hybrid Projections

J includes nine degrees of freedom, so solving Equation 31 for all the elements may be open ended. In order to reduce the degrees of freedom, a new constraint can be introduced. The constraint can be an existing projection from the unit sphere to a rectangle, and to which the projections can be applied to warp the rectangle. For purposes of this disclosure this may be referred to as an intermediate projection P̃. This projection can map from the 3D unit sphere to a rectangle spanning (a, b) in (a, b, c) coordinate space. The next projection can be the first coordinate remapping P̌, which may warp the rectangle along the a axis, preserving the b and c coordinates. This first coordinate remapping can map from (a, b, c) coordinates to (d, e, f) coordinates. The final projection can be the second coordinate remapping P̂, which then may warp the rectangle in (d, e, f) space along the e-axis. This second coordinate remapping can map from (d, e, f) space to (u, v, w) space. The combination of these three projections may be referred to as a hybrid projection P.

$$\tilde{P}(x,y,z) = \hat{P}(\check{P}(\tilde{P}(x,y,z)))) = (u,v,w) \quad (32)$$

The Jacobian of the hybrid projection J̃ can simply be a product of its component projections. The distributive property of the determinant and then the constraints can also be applied to P̌ and P̂.

$$\|\bar{J}(u,v,w)\| = \|\hat{J}(u,v,w)\| \|\breve{J}(\breve{P}^{-1}(u,v,w))\| \quad (33)$$

$$\|\breve{J}(\breve{P}^{-1}(\hat{P}^{-1}(u,v,w)))\|$$

$$= \|\hat{J}(u,v,w)\| \|\breve{J}(u,\hat{p}_e^{-1}(v),w)\|$$

$$\|\breve{J}(\breve{p}_d^{-1}(u),\hat{p}_e^{-1}(v),w)\|$$

Solving for $\tilde{J}(a, b, c)$ may be possible using the intermediate projection. The remapping Jacobians may also have only one variable element in each.

$$\|\breve{J}(d,e,f)\| = \left|\det\begin{bmatrix}\frac{\partial \breve{p}_a^{-1}}{\partial d}(d) & 0 & 0 \\ 0 & 1 & 0 \\ 0 & 0 & 1\end{bmatrix}\right| = \left|\frac{\partial \breve{p}_a^{-1}}{\partial d}(d)\right| \quad (34)$$

$$\|\hat{J}(u,v,w)\| = \left|\det\begin{bmatrix}1 & 0 & 0 \\ 0 & \frac{\partial \hat{p}_e^{-1}}{\partial v}(v) & 0 \\ 0 & 0 & 1\end{bmatrix}\right| = \left|\frac{\partial \hat{p}_e^{-1}}{\partial v}(v)\right| \quad (35)$$

$$\|\bar{J}(u,v,w)\| = \left|\frac{\partial \hat{p}_e^{-1}}{\partial v}(v)\right| \left|\frac{\partial \breve{p}_a^{-1}}{\partial d}(u)\right| \|\breve{J}(\breve{p}_a^{-1}(u), \hat{p}_e^{-1}(v), w)\| \quad (36)$$

Combining equations 31 and 36, a multivariable first-order differential equation can be generated to solve in order to derive the resolution-defined hybrid projection $\overline{P}$.

$$\left|\frac{\partial \hat{p}_d^{-1}}{\partial v}(v)\right| \left|\frac{\partial \breve{p}_a^{-1}}{\partial d}(u)\right| \|\tilde{J}(\breve{p}_d^{-1}(u), \hat{P}_e^{-1}(v), w)\| = \quad (37)$$

$$\frac{N_{\overline{P}}}{|A_{\overline{P}}|} \frac{1}{r_C(\tilde{P}^{-1}(\breve{p}_d^{-1}(u), \hat{p}_e^{-1}(v), w))}$$

Two additional constraints may be applied. By restricting the intermediate projection to have a separable Jacobian and our target resolution function to be separable in $(a, b, c)$ intermediate projection space, then all of Equation 37 can be separable.

$$\|\tilde{J}(a,b,c)\| = {}_a\tilde{J}(a) {}_b\tilde{J}(b) {}_c\tilde{J}(c) \quad (38)$$

$$r_C(x,y,z) = {}_ar_C(\tilde{p}_a(x,y,z)) {}_br_C(\tilde{p}_b(x,y,z)) {}_cr_C(\tilde{p}_c(x,y,z)) \quad (39)$$

$$r_C(\tilde{P}^{-1}(a,b,c)) = {}_ar_C(a) {}_br_C(b) {}_cr_C(c) \quad (40)$$

$$\left|\frac{\partial \hat{p}_e^{-1}}{\partial v}(v)\right| \left|\frac{\partial \breve{p}_a^{-1}}{\partial d}(u)\right| \|_a\tilde{J}(\breve{p}_a^{-1}(u)) {}_b\tilde{J}(\hat{p}_e^{-1}(v)) {}_c\tilde{J}(w)\| = \quad (41)$$

$$\frac{N_{\overline{P}}}{|A_{\overline{P}}|} \frac{1}{{}_ar_C(\breve{p}_a^{-1}(u)) {}_br_C(\hat{p}_e^{-1}(u)) {}_cr_C(w)}$$

Separate differential equations for $\breve{p}_a^{-1}$ and $\hat{p}_e^{-1}$.

$$\left|\frac{\partial \breve{p}_a^{-1}}{\partial d}(u)\right| \propto \frac{1}{\|_a\tilde{J}(\breve{p}_a^{-1}(u))\| {}_ar_C(\breve{p}_a^{-1}(u))} \quad (42)$$

$$\left|\frac{\partial \hat{p}_e^{-1}}{\partial v}(v)\right| \propto \frac{1}{\|_b\tilde{J}(\hat{p}_e^{-1}(v))\| {}_br_C(\hat{p}_e^{-1}(v))} \quad (43)$$

The absolute value can be dropped since $\|J\|$ and $r$ are positive values. Dropping the absolute values can create an even stricter equation, but the differential equations can result in a solvable form with the following solution.

$$\frac{\partial f}{\partial x}(x) \propto \frac{1}{g(f(x))h(f(x))} \quad (44)$$

$$f(x) = y \text{ s.t. } x = \int g(\gamma)h(\gamma)d\gamma \Big|_{\gamma = y} \quad (45)$$

Using these equations, a solution for $\breve{p}_a^{-1}$ and $\hat{p}_3^{-1}$. $\breve{p}_a^{-1}$ that fully defines $\breve{P}$ and $\hat{p}_e^{-1}$ fully defines $\hat{P}$. may be obtained since an intermediate projection $\tilde{P}$ can be chosen (so long as it has the requirements above are satisfied), all three projections can comprise the final hybrid projection $\overline{P}$.

4.2 Equirectangular Intermediate Projection

The equirectangular projection can satisfy the requirements of an intermediate projection above. Equation 27 shows that the Equirectangular Jacobian can be separable.

$$\tilde{J}(a,b,c) = \cos(b) \quad (46)$$

$$_a\tilde{J}(a) = 1 \quad (47)$$

$$_b\tilde{J}(b) = \cos(b) \quad (48)$$

$$_c\tilde{J}(c) = 1 \quad (49)$$

5. Examples

In the following examples, it is demonstrated how a hybrid projection from a target resolution function can be derived.

5.1 Uniform Resolution Function

In a uniform resolution function all directions in virtual reality would be of equal visual quality. Because the equirectangular projection can be used as an intermediate projection, by employing equations 19-28 and 46-49, for example, the target uniform resolution could be any positive value k.

$$r_C(x,y,z) = k = r_C(\tilde{P}^{-1}(a,b,c)) \quad (50)$$

Using Equation 41.

$$\left|\frac{\partial \hat{p}_e^{-1}}{\partial v}(v)\right| \left|\frac{\partial \breve{p}_a^{-1}}{\partial d}(u)\right| \cos(\hat{p}_e^{-1}(v)) = \frac{N_{\overline{P}}}{|A_{\overline{P}}|} \frac{1}{k} \quad (51)$$

$$\frac{\partial \breve{p}_a^{-1}}{\partial d}(u) \propto 1 \quad (52)$$

$$\frac{\partial \hat{p}_e^{-1}}{\partial v}(v) \propto \frac{1}{\cos(\hat{p}_e^{-1}(v))} \quad (53)$$

$$\breve{p}_a^{-1}(u) = u \quad (54)$$

$$\hat{p}_e^{-1}(v) = \sin^{-1}(v) \quad (55)$$

$$\check{p}_u(a) = a \quad (56)$$

$$\hat{p}_v(e) = \sin(e) \quad (57)$$

Combining the first and second coordinate remappings to the Equirectangular intermediate projections can be used to solve for the final hybrid projection of the unit sphere to a unit-sphere rectangle spanned by (u, v).

$$\overline{p}_u(x, y, z) = \tan^{-1}\left(\frac{y}{x}\right) \quad (58)$$

$$\overline{p}_u(x, y, z) = \sin\left(\sin^{-1}\left(\frac{z}{\sqrt{x^2+y^2+z^2}}\right)\right) = \frac{z}{\sqrt{x^2+y^2+z^2}} \quad (59)$$

$$\overline{p}_w(x, y, z) = \sqrt{x^2+y^2+z^2} \quad (60)$$

For the unit sphere $w_0 = \sqrt{x^2+y^2+z^2} = 1$, and a simple mapping from 3D space to 2D space can be solved for.

$$\overline{p}_u(x, y, z) = \tan^{-1}\left(\frac{y}{x}\right) \quad (61)$$

$$\overline{p}_v(x, y, z) = z \quad (62)$$

The Lambert Cylindrical Equal-Area projection derived may be used to solve for the number of pixels in projection space $N_{\overline{p}}$ in order to exactly match the target resolution function.

$$a \in [-\pi, \pi) \quad (63)$$

$$b \in \left[-\frac{\pi}{2}, \frac{\pi}{2}\right] \quad (64)$$

$$u \in \check{p}_u([-\pi, \pi)) = [-\pi, \pi) \quad (65)$$

$$v \in \hat{p}_v\left(\left[-\frac{\pi}{2}, \frac{\pi}{2}\right]\right) = [-1, 1] \quad (66)$$

$$A_{\overline{p}} = (\pi + \pi)(1+1) = 2\pi^2 \quad (67)$$

$$N_{\overline{p}} = \frac{1}{\cos(\sin^{-1}(v))} \cos(\sin^{-1}(v)) k |A_{\overline{p}}| = 2\pi^2 k \quad (68)$$

Therefore, if a uniform spatial resolution of k of the final spherical output content was desired, the Lambert projection with a total of $2\pi^2 k$ pixels.

5.3 Gaussian Resolution Function

To concentrate the resolution in a specific direction, a bivariate gaussian shape for the resolution function may be desired. The resolution can then fall off smoothly in azimuth and elevation with standard deviations σa and σb, respectively and the equirectangular projection may again be used as an intermediate projection.

$$r_C(\overline{P}^{-1}(a, b, c)) = k\exp\left(-\frac{a^2}{2\sigma_a^2}\right)\exp\left(-\frac{b^2}{2\sigma_b^2}\right) \quad (69)$$

When unable to solve for the desired resolution function, as presented in the preceding example, with the addition of a complicated term, however, a better solution may result. as the extra term can increase resolutions near the poles, but the result may still be preferable to the Equirectangular projection.

$$r_C(\overline{P}^{-1}(a, b, c)) = \quad (70)$$

$$k\exp\left(-\frac{a^2}{2\sigma_a^2}\right)\exp\left(-\frac{b^2}{2\sigma_b^2}\right)\frac{\cos\left(\sqrt{\frac{\pi}{2}}\sigma_b \mathrm{erf}\left(\frac{b}{\sqrt{2}\sigma_b}\right)\right)}{\cos(b)}$$

$$\frac{\partial \overline{p}_a^{-1}}{\partial d}(u) \propto \exp\left(\frac{(\overline{p}_a^{-1}(u))^2}{2\sigma_a^2}\right) \quad (71)$$

$$\frac{\partial \hat{p}_e^{-1}}{\partial v}(v) \propto \frac{\exp\left(\frac{(\hat{p}_e^{-1}(v))^2}{2\sigma_b^2}\right)}{\cos\left(\sqrt{\frac{\pi}{2}}\sigma_b \mathrm{erf}\left(\frac{\hat{p}_e^{-1}(v)}{\sqrt{2}\sigma_b}\right)\right)} \quad (72)$$

$$\overline{p}_a^{-1}(u) = \sqrt{2}\sigma_a \mathrm{erf}^{-1}\left(\frac{\sqrt{2}\,u}{\sqrt{\pi}\sigma_a}\right) \quad (73)$$

$$\hat{p}_e^{-1}(v) = \sqrt{2}\sigma_b \mathrm{erf}^{-1}\left(\frac{\sqrt{2}\sin^{-1}(v)}{\sqrt{\pi}\sigma_b}\right) \quad (74)$$

$$\check{p}_u(a) = \frac{\sqrt{\pi}\sigma_a}{\sqrt{2}}\mathrm{erf}\left(\frac{a}{\sqrt{2}\sigma_a}\right) \quad (75)$$

$$\hat{p}_v(e) = \sin\left(\frac{\sqrt{\pi}\sigma_b}{\sqrt{2}}\mathrm{erf}\left(\frac{e}{\sqrt{2}\sigma_b}\right)\right) \quad (76)$$

$$\overline{p}_u(x, y, z) = \frac{\sqrt{\pi}\sigma_a}{\sqrt{2}}\mathrm{erf}\left(\frac{\tan^{-1}\left(\frac{y}{x}\right)}{\sqrt{2}\sigma_a}\right) \quad (77)$$

$$\overline{p}_v(x, y, z) = \sin\left(\frac{\sqrt{\pi}\sigma_b}{\sqrt{2}}\mathrm{erf}\left(\frac{\sin^{-1}\left(\frac{z}{\sqrt{x^2+y^2+z^2}}\right)}{\sqrt{2}\sigma_b}\right)\right) \quad (78)$$

$$\overline{p}_w(x, y, z) = \sqrt{x^2+y^2+z^2} \quad (79)$$

For the unit sphere $w_0 = \sqrt{x^2+y^2+z^2} = 1$, which may result in the final mapping from (x, y, z) to our unit-sphere rectangle in (u, v) space.

$$\overline{p}_u(x, y, z) = \frac{\sqrt{\pi}\sigma_a}{\sqrt{2}}\mathrm{erf}\left(\frac{\tan^{-1}\left(\frac{y}{x}\right)}{\sqrt{2}\sigma_a}\right) \quad (80)$$

$$\overline{p}_v(x, y, z) = \sin\left(\frac{\sqrt{\pi}\sigma_b}{\sqrt{2}}\mathrm{erf}\left(\frac{\sin^{-1}(z)}{\sqrt{2}\sigma_b}\right)\right) \quad (81)$$

Again solving for the number of pixels in projection space $N_{\overline{p}}$ may match any value of k in the original resolution function.

$$a \in [-\pi, \pi) \quad (82)$$

$$b \in \left[-\frac{\pi}{2}, \frac{\pi}{2}\right] \quad (83)$$

$$u \in \check{p}_u([-\pi, \pi)) = \left[\frac{\sqrt{\pi}\sigma_a}{\sqrt{2}}\mathrm{erf}\left(\frac{-\pi}{\sqrt{2}\sigma_a}\right), \frac{\sqrt{\pi}\sigma_a}{\sqrt{2}}\mathrm{erf}\left(\frac{\pi}{\sqrt{2}\sigma_a}\right)\right) \quad (84)$$

$$v \in \hat{p}_v([-\tfrac{\pi}{2}, \tfrac{\pi}{2}]) = \left[\sin\left(\frac{\sqrt{\pi}\,\sigma_b}{\sqrt{2}}\mathrm{erf}\left(\frac{-\tfrac{\pi}{2}}{\sqrt{2}\,\sigma_b}\right)\right),\right. \quad (85)$$

$$\left.\sin\left(\frac{\sqrt{\pi}\,\sigma_b}{\sqrt{2}}\mathrm{erf}\left(\frac{\tfrac{\pi}{2}}{\sqrt{2}\,\sigma_b}\right)\right)\right]$$

The fact that sin and erf are both odd functions can be used to simplify the calculation of the total area.

$$A_{\bar{P}} = 2\left(\frac{\sqrt{\pi}\,\sigma_a}{\sqrt{2}}\mathrm{erf}\left(\frac{\tfrac{\pi}{2}}{\sqrt{2}\,\sigma_a}\right)\right)\left(2\sin\left(\frac{\sqrt{\pi}\,\sigma_b}{\sqrt{2}}\mathrm{erf}\left(\frac{\tfrac{\pi}{2}}{\sqrt{2}\,\sigma_b}\right)\right)\right) \quad (86)$$

$$= 2\sqrt{2\pi}\,\sigma_a\mathrm{erf}\left(\frac{\pi}{\sqrt{2}\,\sigma_a}\right)\sin\left(\frac{\sqrt{\pi}\,\sigma_b}{\sqrt{2}}\mathrm{erf}\left(\frac{\tfrac{\pi}{2}}{\sqrt{2}\,\sigma_b}\right)\right)$$

Just like the uniform resolution projection aforementioned, all the terms except k and $|A\bar{P}|$ can cancel in the equation for the number of pixels $N_{\bar{P}}$.

$$N_{\bar{P}} = k|A_{\bar{P}}| = k2\sqrt{2\pi}\,\sigma_a\mathrm{erf}\left(\frac{\pi}{\sqrt{2}\,\sigma_a}\right)\sin\left(\frac{\sqrt{\pi}\,\sigma_b}{\sqrt{2}}\mathrm{erf}\left(\frac{\tfrac{\pi}{2}}{\sqrt{2}\,\sigma_b}\right)\right) \quad (87)$$

Given in equation 70 the resolution at $(a, b)=(0, 0)$ (forward, center), can be equal to k, scaling of the desired forward resolution by $|A_{\bar{P}}|$ may be used to calculate the required number of pixels.

5.2 Cauchy Resolution Function

The final projection equations for the gaussian resolution function can be fairly computationally expensive. In addition, it may also be useful to use a function with fatter tails, so the resolution decrease isn't quite so dramatic. Following is an example on how the Cauchy function can be used to solve these issues.

$$r_C(\bar{P}^{-1}(a, b, c)) = k\frac{1}{\left(1+\left(\tfrac{a}{\gamma_a}\right)^2\right)}\frac{1}{\left(1+\left(\tfrac{b}{\gamma_b}\right)^2\right)} \quad (88)$$

Whilst it may not be possible to solve for the elevational Cauchy function exactly, with the inclusion of an extra term, it can be possible to approximate the Cauchy function and find a valid solution projection.

$$r_C(\bar{P}^{-1}(a, b, c)) = k\frac{1}{\left(1+\left(\tfrac{a}{\gamma_a}\right)^2\right)}\frac{1}{\left(1+\left(\tfrac{b}{\gamma_b}\right)^2\right)}\frac{\cos\left(\gamma_b\tan^{-1}\left(\tfrac{b}{\gamma_b}\right)\right)}{\cos(b)} \quad (89)$$

$$\frac{\partial \hat{p}_a^{-1}}{\partial d}(u) \propto 1+\left(\frac{\hat{p}_a^{-1}(u)}{\gamma_a}\right)^2 \quad (90)$$

$$\frac{\partial \hat{p}_e^{-1}}{\partial v}(v) \propto \frac{1+\left(\tfrac{\hat{p}_e^{-1}(v)}{\gamma_b}\right)^2}{\cos\left(\gamma_b\tan^{-1}\left(\tfrac{\hat{p}_e^{-1}(v)}{\gamma_b}\right)\right)} \quad (91)$$

$$\hat{p}_a^{-1}(u) = \gamma_a\tan\left(\frac{u}{\gamma_a}\right) \quad (92)$$

$$\hat{p}_e^{-1}(v) = \gamma_b\tan\left(\frac{\sin^{-1}(v)}{\gamma_b}\right) \quad (93)$$

$$\hat{p}_u(a) = \gamma_a\tan^{-1}\left(\frac{a}{\gamma_a}\right) \quad (94)$$

$$\hat{p}_v(e) = \sin\left(\gamma_b\tan^{-1}\left(\frac{e}{\gamma_b}\right)\right) \quad (95)$$

$$\bar{p}_u(x, y, z) = \gamma_a\tan^{-1}\left(\frac{\tan^{-1}\left(\tfrac{y}{x}\right)}{\gamma_a}\right) \quad (96)$$

$$\bar{p}_v(x, y, z) = \sin\left(\gamma_b\tan^{-1}\left(\frac{\sin^{-1}\left(\tfrac{z}{\sqrt{x^2+y^2+z^2}}\right)}{\gamma_b}\right)\right) \quad (97)$$

$$\bar{p}_w(x,y,z) = \sqrt{x^2+y^2+z^2} \quad (98)$$

For the unit sphere $w_0 = \sqrt{x^2+y^2+z^2} = 1$, and a final mapping from $(x, y, z)$ to our unit-sphere rectangle in $(u, v)$ space can result.

$$\bar{p}_u(x, y, z) = \gamma_a\tan^{-1}\left(\frac{\tan^{-1}\left(\tfrac{y}{x}\right)}{\gamma_a}\right) \quad (99)$$

$$\bar{p}_v(x, y, z) = \sin\left(\gamma_b\tan^{-1}\left(\frac{\sin^{-1}(z)}{\gamma_b}\right)\right) \quad (100)$$

Again by solving for the number of pixels in projection space, any value of k in the original resolution function may be matched.

$$a \in [-\pi, \pi) \quad (101)$$

$$b \in \left[-\tfrac{\pi}{2}, \tfrac{\pi}{2}\right] \quad (102)$$

$$u \in \hat{p}_u([-\pi, \pi)) = \left[\gamma_a\tan^{-1}\left(\frac{-\pi}{\gamma_a}\right), \gamma_a\tan^{-1}\left(\frac{\pi}{\gamma_a}\right)\right] \quad (103)$$

$$v \in \hat{p}_v\left(\left[-\tfrac{\pi}{2}, \tfrac{\pi}{2}\right]\right) = \left[\sin\left(\gamma_b\tan^{-1}\left(\frac{-\tfrac{\pi}{2}}{\gamma_b}\right)\right), \sin\left(\gamma_b\tan^{-1}\left(\frac{\tfrac{\pi}{2}}{\gamma_b}\right)\right)\right] \quad (104)$$

Because sin and $\tan^{-1}$ are both odd functions, to simplify the calculation of the total area.

$$A_{\bar{P}} = 2\left(\gamma_a\tan^{-1}\left(\frac{\pi}{\gamma_a}\right)\right)2\sin\left(\gamma_b\tan^{-1}\left(\frac{\tfrac{\pi}{2}}{\gamma_b}\right)\right) \quad (105)$$

$$= 4\gamma_a\tan^{-1}\left(\frac{\pi}{\gamma_a}\right)\sin\left(\gamma_b\tan^{-1}\left(\frac{\tfrac{\pi}{2}}{\gamma_b}\right)\right)$$

Just like the uniform resolution projection previously, all the $N_{\bar{P}}$ is except k and $|A_{\bar{P}}|$ may cancel in the equation for the number of pixels $N_{\bar{P}}$.

$$N_P = k|A_P| = k4\gamma_a \tan^{-1}\left(\frac{\pi}{\gamma_a}\right) \sin\left(\gamma_b \tan^{-1}\left(\frac{\frac{\pi}{2}}{\gamma_b}\right)\right) \quad (106)$$

In equation 89, the resolution at (a, b)=(0, 0) (forward, center), can again be equal to k. Therefore, scaling of our desired forward resolution by $|A_{\vec{P}}|$ to calculate the required number of pixels may again be desired.

Figure 6:
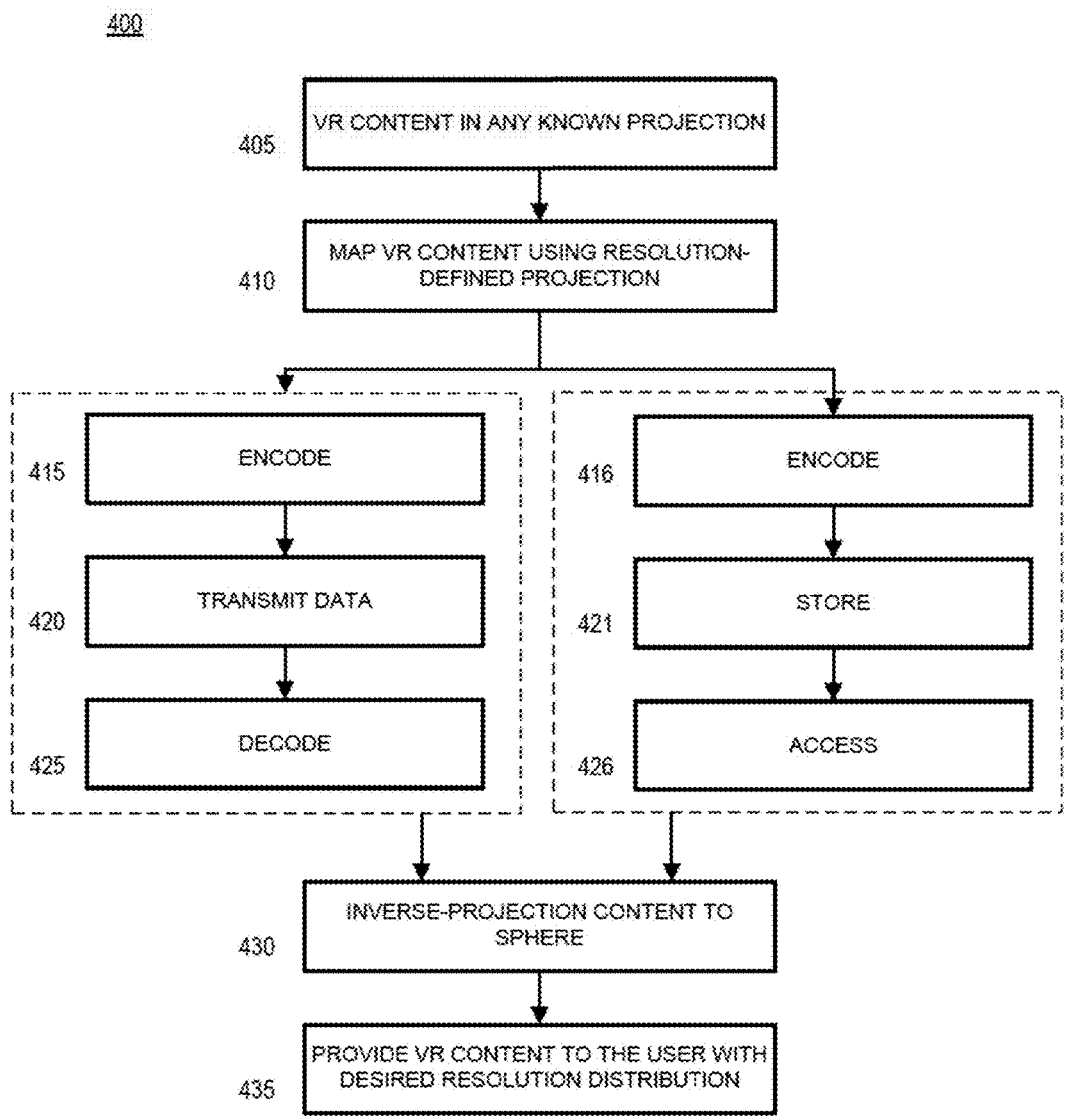
FIG. 6 is a flowchart illustrating method steps that may be implemented to transmit virtual reality content according to additional aspects of the disclosure.
Figure 7:
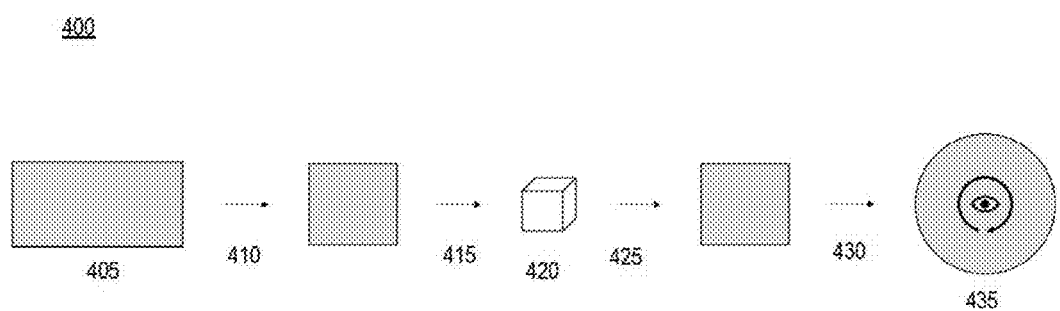
FIG. 7 is a schematic representation illustrating the method steps of FIG. 6.

Referring now to FIGS. 6 and 7, a flowchart 400 and corresponding schematic representation 500 illustrating method steps that may be implemented to transmit virtual reality content according to some aspects of the disclosure are shown. Both FIGS. 6 and 7 will reference common numeral identifiers as appropriate to help illustrate the relationship between method steps for transmitting virtual reality content process. Beginning at 405, any virtual reality content may be received, uploaded and/or recorded, (i.e., transmitted) to the system so long as the projection is known or can be determined from the content. In some embodiments, the content may be uploaded in two dimensional equirectangular format and come from one or multiple virtual reality recording devices. Alternatively, the content may be in 360° spherical three dimensional format. Where content is in 360° spherical three dimensional format, for every projection mapping from a three dimensional sphere content to a flat two dimensional projections there may be non-uniform distortions. By rotating this projection and applying it to the same content different renditions of the same content can be generated with more or less distortion on the sphere of possible viewing directions. Using the viewing direction (either intended or determined by the virtual reality projection device) and correlating it to the rendition delivered can improve the visible resolution for the user, therefore improving the immersion of same virtual reality content, even with the same hardware and bandwidth constraints.

According to additional aspects of the disclosure, custom projections can be implemented to magnify the range of distortions across a projection (as explained above). This can exaggerate the differences in resolution depending on viewing angle, thus enabling the delivery of higher resolution projections for the most relevant view direction (as compared to those portions of the virtual reality content that are not immediately visible). All of this can be accomplished while also reducing the bitrate of the transmitted video, as the content in its new projection format can be encoded in such a way that its bitrate is lower than the original content, but the resolution in the view direction is the same as the original content.

At 410, the content can be mapped using a resolution-defined projection. The resolution-defined projection may be generated, for example, according to one or more of the developed projections with Gaussian, Cosine, Uniform, and Cauchy resolution distributions or combinations thereof. The mapping of the content may be repeated as to generate at least one rendition using variously-rotated and/or variously-shaped projections that can be encoded at 415 for transmission at 420 and decoding at 425 at the VR device. Storing (not shown) may optionally occur at one or more stages of the process. In some fully integrated embodiments, such as PCs, wireless devices, and those with immersive displays, the content is encoded at 416, stored at 421 and accessed accordingly at 426, without a need of either or both transmission or decoding.

The rendition(s) can use the same or different projections rotation in azimuth and elevation as the base projections, or could even implement combinations thereof. However, unlike in the currently implemented video streaming processes in which multiple renditions at different sizes and bitrates are used, the renditions generated herein are fundamentally different because of the different projections used to provide optimized resolutions and encoding. In accordance with some aspects of the disclosure, the different projections can generally be pre-determined defined, for example, by a desired resolution distribution according to the view direction and/or, on the fly, for example, by a desired resolution distribution that adapts to parameters of the device, bandwidth limitations, and the such.

In some embodiments, data definitive of the mapping and/or the desired resolution may be included along the virtual reality content for organized transmission at 420 of dynamically selected projection versions according to the viewing direction and decoding 425 at the virtual reality projection device. According to aspects of the disclosure, the dynamically selected projection versions may include only a subset of a generated rendition. The virtual reality projection device may include an app installed that is configured to transmit virtual reality content requests (including, for example, viewing direction defined requests) and receive the corresponding data for decoding accordingly. Depending on the desired resolution and bandwidth available for the transmission of the renditions, one or more renditions may be transmitted to the user's virtual reality device. Once the appropriate rendition has been received by the display device, a reverse projection is applied to the content to map it back to the full sphere of content it was derived from. In some embodiments, the virtual reality device already has knowledge of which rendition it requested, so using the correct parameters for projection may be trivial.

According to some aspects, any additional renditions transmitted may be used as a small buffer to the user's viewing direction, for example. Once the content is decoded at 425, inverse-projection content may be projected to a sphere at 430. Using the resolution-defined projection parameters, the virtual reality content can be projected in accordance with the desired resolution distribution at 435, so that it is of higher resolution in the areas of interest. The virtual reality user views virtual reality content with higher resolution in their view direction without data unnecessarily transmitted to perfectly recreate content in their periphery or out of their field of view. This method can be used to reduce virtual reality content bitrate without sacrificing visible resolution, or to improve visible resolution without increasing bitrate, or a combination of improved visible resolution and reduced bitrate. Since it can be possible to deliver higher visible resolution content with fewer pixels, constraints on resolution imposed by the processing power of the display device can also be mitigated. For example, many virtual reality devices are capable of decoding a maximum number of pixels per second so by projecting the virtual reality content in a different way, the visible resolution can be further improved without exceeding this maximum processing speed.

Figure 8:
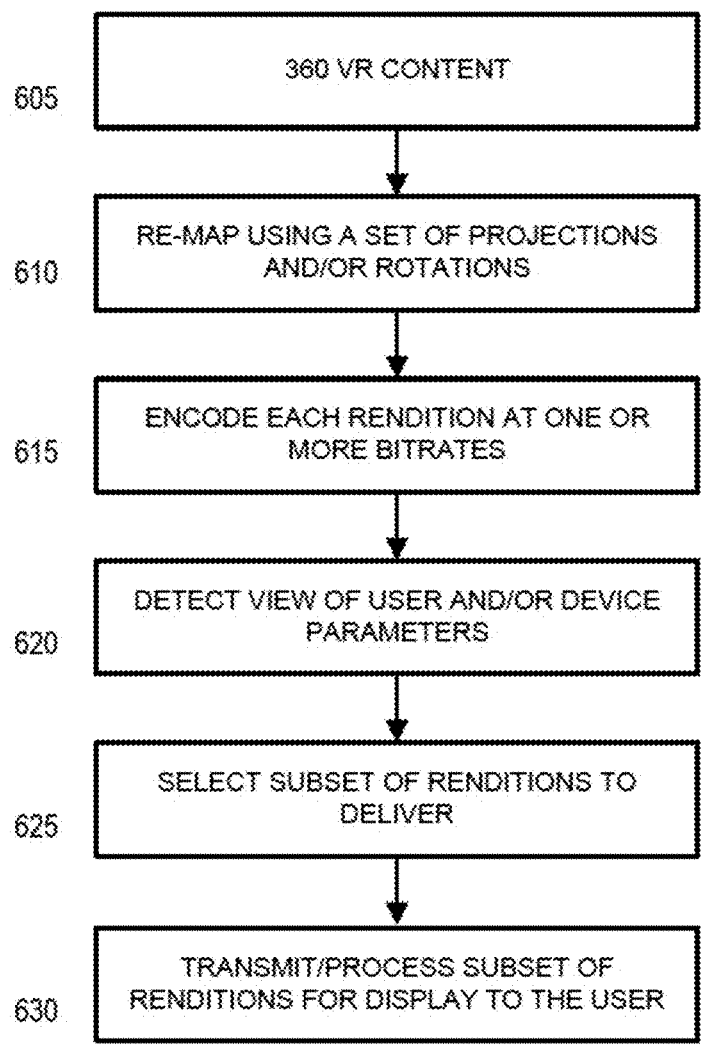
FIG. 8 is a flowchart illustrating method steps that may be implemented to process and deliver virtual reality content according to yet additional aspects of the disclosure.
Figure 9:
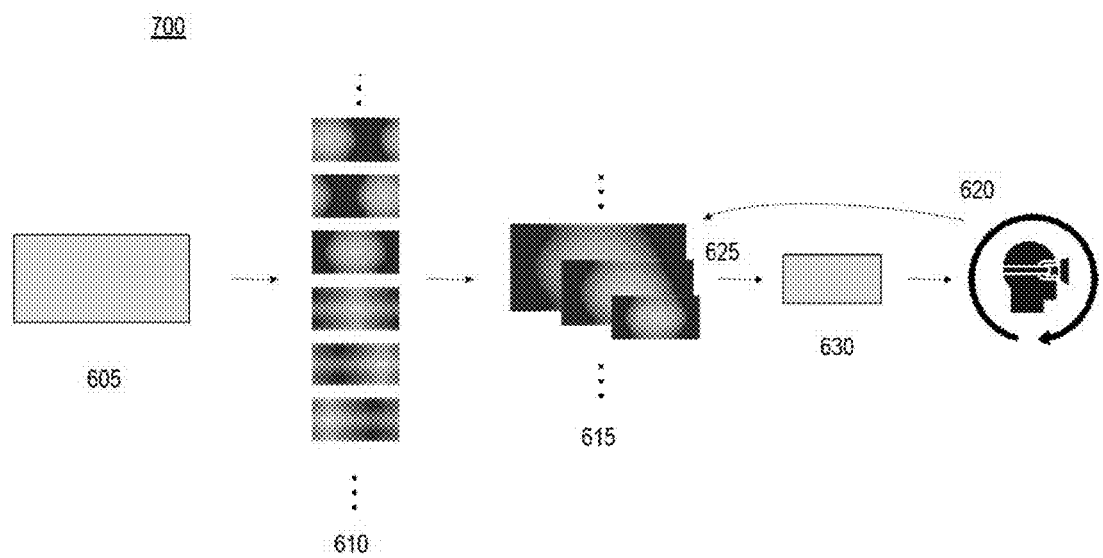
FIG. 9 is a schematic representation illustrating the method steps of FIG. 8.

Referring now to FIGS. 8 and 9, a flowchart 600 and corresponding schematic representation 700 illustrating method steps that may be implemented to process and deliver virtual reality content according to some aspects of the disclosure are shown. Both FIGS. 6 and 7 will reference common numeral identifiers as appropriate to help illustrate the relationship between method steps for processing and transmitting virtual reality content.

Beginning at 605, 360° virtual reality content is transmitted to a processing device. According to aspects of the disclosure, in order to use traditional media encoding and compression techniques, the content can be re-mapped to a two-dimensional rectangular projection to avoid extraneous data. At 610, as previously described, a set of projections and/or rotations can then be mapped. At 615, each of those renditions can then be encoded at one or more bitrates. At 620, head and/or eye movement tracking can be used to determine a viewing direction of the user. This data can be obtained from the head mounted virtual reality devices' gyroscopes and/or a sensor tracking the user's pupils during viewing of content or other methods of view direction tracking preexisting in the virtual reality device. At 620, the viewing direction data may be used to, select a subset of renditions to be delivered to the virtual reality device at 625. In addition to or alternatively at 620, detection of available bandwidth and/or viewing device parameters may be used to determine the selection of the projections. Where viewing direction is used for the selection, for example, by, detecting the user's viewing direction and, taking into account the fact that human vision degrades away from the focus point, the subset of virtual reality content that can be selected is optimized for that viewing direction. Where the viewing device parameters are used for the selection, for example, the maximum DPI of the screen may be used for the selection, to ensure the subset closely matches the maximum DPI of the screen and avoid unnecessary processing. The subset of renditions selected are then transmitted to the virtual reality device of the user for display of the virtual reality content at 630.

According to additional aspects of the disclosure, in addition to the use of viewing direction, the process steps can further be used to automatically generate projections based on the content or recorded moving patterns. For example, the regions in virtual reality content in which greater motion is detected through motion detection algorithms, a resolution distribution that includes greater resolution in those corresponding regions could be determined. By taking into account that the user may be focused on the activity/movement, the higher definition in those regions then provide a more immersive experience to the user.

According to yet additional aspects, this method could also be used in conjunction with the implementation of crowd-sourced data to define, at least in part, which areas of the virtual reality content should include the higher distributions and or establish moving patterns that can be used for predictive generation of the renditions. More specifically, by aggregating data from many viewers of the same or other virtual reality content (viewing direction, moving patterns, focus, emotional reactions and/or physiological changes), the data may be used to improve the virtual reality experience, including, for example, to create desired resolution distribution profiles specific to the virtual reality content or viewer or to select one or more existing renditions.

The many features and advantages of the invention are apparent from the detailed specification, and thus, it is intended by the appended claims to cover all such features and advantages of the invention which fall within the true spirit and scope of the invention. Further, because numerous modifications and variations will readily occur to those skilled in the art, it is not desired to limit the invention to the exact construction and operation illustrated and described, and accordingly, all suitable modifications and equivalents may be resorted to, falling within the scope of the invention.

We claim:

1. A system for predictive processing and delivering virtual reality content, the system comprising:
   one or more computer servers comprising one or more processors and one or more storage devices; and
   executable software stored on at least one of the one or more storage devices and executable on demand, the software operative with at least one of the one or more processors to cause the one or more computer servers to:
   process feedback data relating to one or more events related to a virtual reality content;
   receive sensor data to determine one or more of a viewing direction or an orientation of a user;
   additionally receive data descriptive of the virtual reality content;
   predict, based at least in part on the feedback data, a change in one or more of the determined viewing direction or the determined orientation;
   generate one or more two-dimensional renditions from the virtual reality content, wherein the one or more two-dimensional renditions are generated by mapping the virtual reality content to a two-dimensional bijective resolution-defined projection, wherein each of the one or more two-dimensional renditions represents a full sphere of the virtual reality content;
   select at least one of the one or more two-dimensional renditions for display; and
   cause display, by a display device, an inverse projection of the virtual reality content to a sphere or other three-dimensional shape,
   wherein one or more of the generating the one or more two-dimensional renditions or the selecting at least one of the one or more two-dimensional renditions for display is based at least in part on the predicted change in one or more of the determined viewing direction or the determined orientation.

2. The system of claim 1, wherein the feedback data comprises one or more of pre-recorded data on the one or more storage devices based on feedback received from the user during at least one previous display of virtual reality content or crowdsourced data relating to a location of the virtual reality content.

3. The system of claim 1, wherein the feedback data comprises pre-recorded data on the one or more storage devices based on feedback received from the user during at least one previous display of virtual reality content.

4. The system of claim 1, wherein the feedback data comprises crowdsourced data recorded on the one or more storage devices relating to a location of the virtual reality content.

5. A computer-implemented method for predictive processing and delivering virtual reality content, the method comprising:
   processing, by a computer system, feedback data relating to one or more events related to a virtual reality content;
   receiving, by the computer system, sensor data to determine a viewing direction of a user;
   additionally receiving, by the computer system, data descriptive of a location of the virtual reality content;
   predicting, by the computer system, based at least in part on the feedback data, a change in the determined viewing direction of the user;
   generating, by the computer system, one or more two-dimensional renditions from the virtual reality content, wherein the one or more two-dimensional renditions are generated by mapping the virtual reality content to a two-dimensional bijective resolution-defined projection, wherein each of the one or more two-dimensional renditions represents a full sphere of the virtual reality content;

selecting, by the computer system, at least one of the one or more two-dimensional renditions for display; and causing, by the computer system, display on a display device an inverse projection of the virtual reality content to a sphere or other three-dimensional shape, wherein one or more of the generating the one or more two-dimensional renditions or the selecting at least one of the one or more two-dimensional renditions for display is based at least in part on the predicted change in the determined viewing direction, and wherein the computer system comprises a computer processor and an electronic storage medium.

6. The computer-implemented method of claim 5, wherein the feedback data comprises one or more of pre-recorded data based on feedback received from the user during at least one previous display of virtual reality content or crowdsourced data relating to the location of the virtual reality content.

7. The computer-implemented method of claim 5, wherein the two dimensional bijective resolution-defined projection is created according to a desired resolution distribution, wherein the desired resolution distribution is defined by at least one or more of: a fovea field of view, contrast of the virtual reality content, movement of the virtual reality content, arrangement and geometry of a capturing camera, lens of a capturing camera, display parameters, or crowd sourced data relating to the virtual reality content.

8. The computer-implemented method of claim 7 further comprising one or more of:
compressing or encoding at least one or more of the two-dimensional renditions based at least in part on the predicted change in the determined viewing direction at one or more resolutions.

9. The computer-implemented method of claim 7, further comprising one or more of:
compressing or encoding at least one or more of the two-dimensional renditions based at least in part on the predicted change in the determined viewing direction at one or more bitrates.

10. The computer-implemented method of claim 5, wherein the feedback data comprises pre-recorded data based on feedback received from the user during at least one previous display of virtual reality content.

11. The computer-implemented method of claim 5, wherein the feedback data comprises crowdsourced data relating to the location of the virtual reality content.

12. A computer-implemented method for predictive processing and delivering virtual reality content, the method comprising:
processing, by a computer system, feedback data relating to one or more events related to a virtual reality content;

additionally receiving, by the computer system, data descriptive of the virtual reality content;

identifying, by the computer system, based at least in part on the feedback data and the data descriptive of the virtual reality content, at least one area of interest;

generating, by the computer system, one or more two-dimensional renditions from the virtual reality content, wherein the one or more two-dimensional renditions are generated by mapping the virtual reality content to a two-dimensional bijective resolution-defined projection, wherein each of the one or more two-dimensional renditions represents a full sphere of the virtual reality content;

selecting, by the computer system, at least one of the one or more two-dimensional renditions for display; and causing, by the computer system, display on a display device an inverse projection of the virtual reality content to a sphere or other three-dimensional shape, wherein one or more of the generating the one or more two-dimensional renditions or the selecting at least one of the one or more two-dimensional renditions for display is based at least in part on the identified area of interest, and wherein the computer system comprises a computer processor and an electronic storage medium.

13. The computer-implemented method of claim 12, wherein the one or more two-dimensional bijective resolution-defined projection is created according to a desired resolution distribution.

14. The computer-implemented method of claim 13, wherein the desired resolution distribution is defined by at least one or more of: a fovea field of view, contrast of the virtual reality content, movement of the virtual reality content, arrangement and geometry of a capturing camera, lens of a capturing camera, display parameters, or crowd sourced data relating to the virtual reality content.

15. The computer-implemented method of claim 12, wherein the feedback data comprises one or more of pre-recorded data based on feedback received from the user during at least one previous display of virtual reality content or crowdsourced data relating to a location of the virtual reality content.

16. The computer-implemented method of claim 12, wherein the feedback data comprises pre-recorded data based on feedback received from the user during at least one previous display of virtual reality content.

17. The computer-implemented method of claim 12, wherein the feedback data comprises crowdsourced data relating to a location of the virtual reality content.

18. The computer-implemented method of claim 12, wherein the area of interest is determined by pre-recorded determined viewing directions relating to a location of the virtual reality content.

* * * * *

UNITED STATES PATENT AND TRADEMARK OFFICE
CERTIFICATE OF CORRECTION

PATENT NO. : 9,865,092 B2  
APPLICATION NO. : 15/151322  
DATED : January 9, 2018  
INVENTOR(S) : Charles Dunn et al.

Page 1 of 2

It is certified that error appears in the above-identified patent and that said Letters Patent is hereby corrected as shown below:

On the Title Page

Item (57), (Abstract) at Line 6, Change "in" to --In--.

In the Specification

In Column 2 at Line 26, Change "that," to --that--.

In Column 2 at Line 31, Change "require men" to --requirements--.

In Column 2 at Line 53, Change "image video" to --image/video--.

In Column 2 at Line 66, After "processing" insert --and/or delivery of virtual reality content due to streaming, image processing and resolution--.

In Column 3 at Line 5, Change "of;" to --of:--.

In Column 3 at Line 50, Change "crowd sourced" to --crowdsourced--.

In Column 4 at Line 39, Change "interest:" to --interest;--.

In Column 5 at Line 44, Change "necessarily," to --necessarily--.

In Column 5 at Line 49, Change "hi" to --In--.

In Column 7 at Line 2, Change "device." to --device,--.

In Column 8 at Line 45, Change "in" to --In--.

In Column 9 at Line 61, Change "350°" to --360°--.

<div style="text-align:right">
Signed and Sealed this<br>
First Day of May, 2018
</div>

Andrei Iancu  
*Director of the United States Patent and Trademark Office*

CERTIFICATE OF CORRECTION (continued)
U.S. Pat. No. 9,865,092 B2

In Column 11 at Line 36, Change "record," to --record--.

In Column 15 at Line 12 (approx.), Change "P·" to --P.--.

In Column 16 at Line 4 (approx.), Change "$_i\Sigma_C$," to --$_ip_C$,--.

In Column 18 at Line 1, Change "at" to --$\infty$ at--.

In Column 18 at Line 60 (approx.), Change "P." to --$\bar{P}$.--.

In Column 20 at Line 18 (approx.), Change "$\hat{p}_3^{-1}$." to --$\hat{p}_e^{-1}$.--.

In Column 20 at Line 19 (approx.), Change "$\hat{P}$." to --$\hat{P}$--.

In Column 27 at Line 16 (approx.), Change "to," to --to--.

In Column 27 at Line 21, Change "by," to --by--.

In Column 27 at Line 49, Change "and or" to --and/or--.